(12) United States Patent
Kim et al.

(10) Patent No.: US 12,429,957 B2
(45) Date of Patent: Sep. 30, 2025

(54) ELECTRONIC DEVICE AND METHODS FOR SYNCHRONIZING AUTO-COMPLETE TEXT FROM EXTERNAL DEVICE

(71) Applicant: Samsung Electronics Co., Ltd., Gyeonggi-do (KR)

(72) Inventors: Seokwon Kim, Gyeonggi-do (KR); Yeongu Kang, Gyeonggi-do (KR); Sangheon Kim, Gyeonggi-do (KR); Minchul Shin, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 17/885,735

(22) Filed: Aug. 11, 2022

(65) Prior Publication Data

US 2023/0049881 A1   Feb. 16, 2023

Related U.S. Application Data

(63) Continuation of application No. PCT/KR2022/011311, filed on Aug. 1, 2022.

(30) Foreign Application Priority Data

Aug. 10, 2021   (KR) .................. 10-2021-0105003

(51) Int. Cl.
  *G06F 40/274* (2020.01)
  *G06F 3/023* (2006.01)
  *G06F 3/04886* (2022.01)

(52) U.S. Cl.
  CPC ........ *G06F 3/0237* (2013.01); *G06F 3/04886* (2013.01); *G06F 40/274* (2020.01)

(58) Field of Classification Search
  None
  See application file for complete search history.

(56) References Cited

U.S. PATENT DOCUMENTS

| | | | |
|---|---|---|---|
| 7,657,423 B1 * | 2/2010 | Harik .................... | G06F 40/274 |
| | | | 715/261 |
| 8,370,143 B1 * | 2/2013 | Coker .................. | G06F 40/274 |
| | | | 704/240 |

(Continued)

FOREIGN PATENT DOCUMENTS

| | | |
|---|---|---|
| CN | 109582155 B | 5/2023 |
| KR | 10-2015-0098096 A | 8/2015 |

(Continued)

OTHER PUBLICATIONS

International Search Report dated Oct. 28, 2022.
Extended European Search Report dated Sep. 5, 2024.

*Primary Examiner* — Seong-Ah A Shin
(74) *Attorney, Agent, or Firm* — Cha & Reiter, LLC.

(57) ABSTRACT

An electronic device and method are disclosed. The electronic device includes communication circuitry, a display, memory and a processor. The processor implements the method, including: establishing, by control of the processor, a communicative connection to an external device via the communication circuitry; receiving via the communicative connection, auto-complete text input information from the external device; storing, in the memory, the received auto-complete text input information, for usage with a keyboard process of the electronic device; and displaying, via a display, a recommended word, based on the stored auto-complete text input information, wherein the auto-complete text input information includes at least one of user data including complete words for recommendation as predictive text, generated from collecting and applying artificial-intelligence (AI) self-learning on words frequently utilized by a (Continued)

user, and user-defined text shortcuts configured by the user which associate an incomplete input with a completed word for usage as the predictive text.

20 Claims, 23 Drawing Sheets

(56) References Cited

U.S. PATENT DOCUMENTS

| | | | |
|---|---|---|---|
| 9,626,429 B2 | 4/2017 | Unruh | |
| 10,671,811 B2 | 6/2020 | Tiitola | |
| 11,520,413 B2 | 12/2022 | Yu | |
| 2008/0294982 A1 | 11/2008 | Leung et al. | |
| 2010/0036923 A1* | 2/2010 | Byrne | G06Q 10/107 709/206 |
| 2011/0205851 A1 | 8/2011 | Harris | |
| 2014/0136599 A1* | 5/2014 | Shiue | H04L 67/1095 709/203 |
| 2014/0372896 A1* | 12/2014 | Raman | G06F 3/017 715/741 |
| 2015/0058720 A1* | 2/2015 | Smadja | H04L 51/226 715/271 |
| 2015/0067493 A1 | 3/2015 | Son et al. | |
| 2015/0293602 A1* | 10/2015 | Kay | G06F 3/04883 715/752 |
| 2017/0154125 A1 | 6/2017 | Balakrishnan et al. | |
| 2018/0367480 A1* | 12/2018 | Housman | G06F 40/247 |
| 2020/0042174 A1 | 2/2020 | Rakshit et al. | |
| 2020/0150794 A1* | 5/2020 | Han | G06F 3/01 |
| 2020/0257377 A1* | 8/2020 | Lee | G06F 40/274 |
| 2021/0365632 A1* | 11/2021 | Trim | G06N 20/00 |
| 2021/0374361 A1* | 12/2021 | Wick | G06F 40/58 |
| 2022/0075941 A1* | 3/2022 | Huang | G06F 40/274 |

FOREIGN PATENT DOCUMENTS

| | | |
|---|---|---|
| KR | 10-2016-0101567 A | 8/2016 |
| KR | 10-1645674 B1 | 8/2016 |
| KR | 10-2017-0019811 A | 2/2017 |
| KR | 10-2018-0087608 A | 8/2018 |
| KR | 10-2020-0050880 A | 5/2020 |
| KR | 10-2020-0098068 A | 8/2020 |

\* cited by examiner

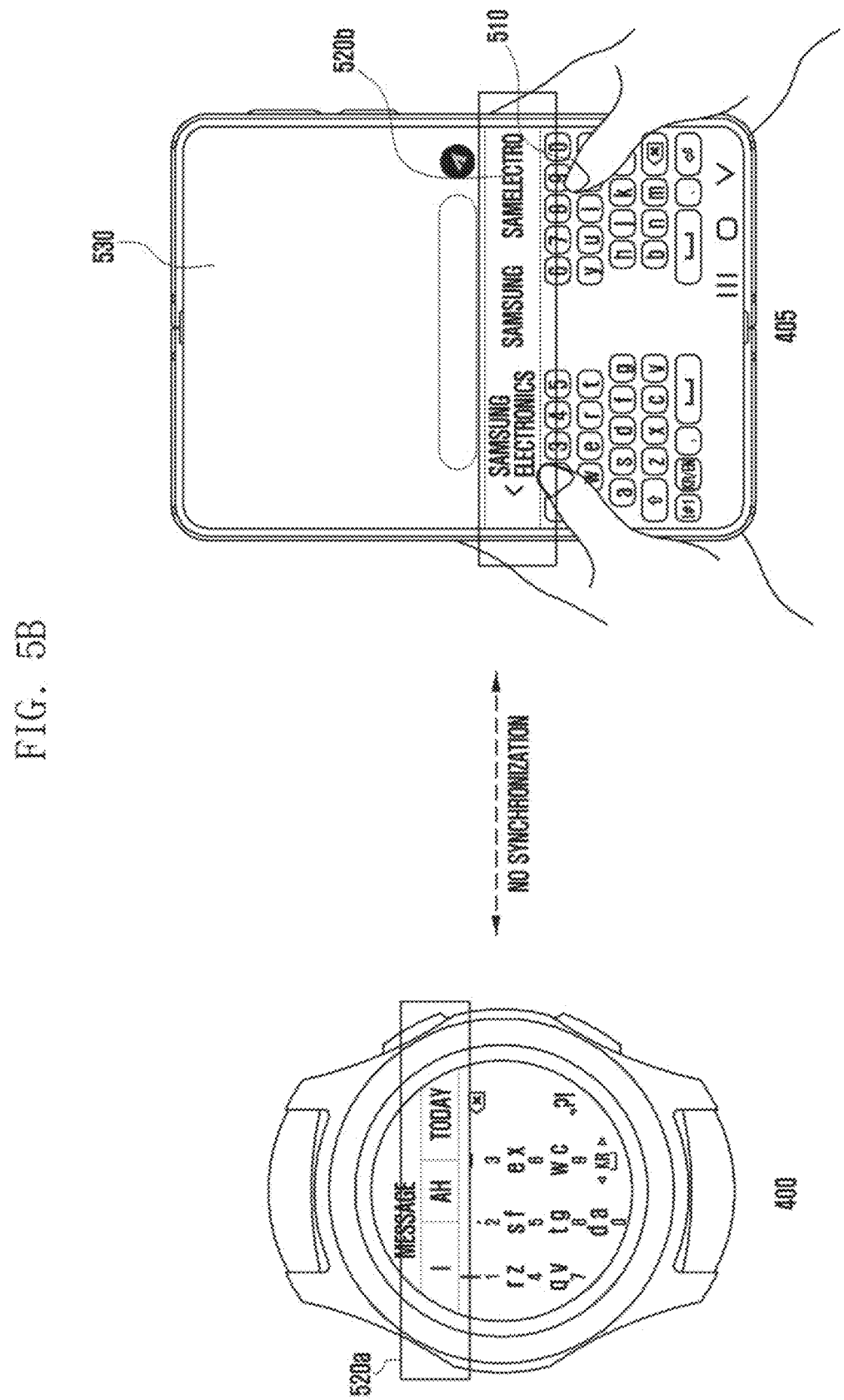

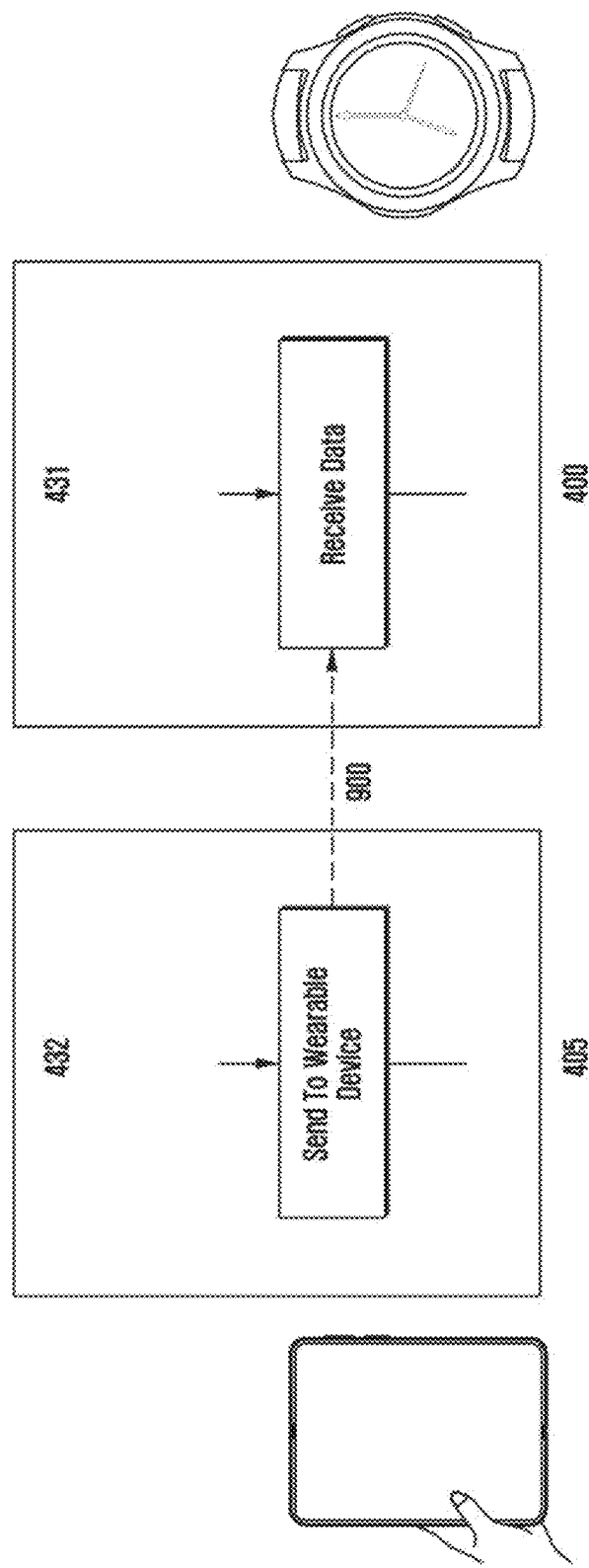

ELECTRONIC DEVICE AND METHODS FOR SYNCHRONIZING AUTO-COMPLETE TEXT FROM EXTERNAL DEVICE

CROSS-REFERENCE TO RELATED APPLICATION(S)

This application is a continuation of, based on and claims priority under 35 U.S.C. § 120 to PCT International Application No. PCT/KR2022/011311, which was filed on Aug. 1, 2022, and claims priority to Korean Patent Application No. 10-2021-0105003, filed on Aug. 10, 2021, in the Korean Intellectual Property Office, the disclosures of which are incorporated by reference herein their entirety.

BACKGROUND

Technical Field

The disclosure relates to predictive text, and, more particular, to synchronizing predictive text across two paired electronic devices.

Description of Related Art

Portable electronic devices have become increasingly commonplace. One example of portable electronic devices is the wearable device, which can be affixed to a body of a user. These wearable devices implement one or more functions, and can often output multimedia, facilitate data inputs/outputs, store data, etc. As portable devices have grown increasingly compact, development has been ongoing on many sub-variations of the same, such as smart watches that can be worn on the wrist of a user.

In some portable devices, data is transceivable with external devices through wireless connections, such as short-range Bluetooth connection, or Long-Term Evolution (LTE) and $5^{th}$ Generation (5G) networks). The wireless communication type may include, for example 1:1 pairing, multi-connection types, cloud-assisted storage (e.g., Samsung Cloud), and multi-device connections allowing mass uploads and mass downloads.

SUMMARY

An electronic device may transmit/receive identical data, in the case of an identical account, based on a specific user account (for example, Samsung Account), thereby providing an identical user experience.

An electronic device, such as a smartphone or a tablet PC, may detect and store words that are frequently input by the user, using an advanced software input device (in which the storage type and the exposure rate may vary, depending on the word input frequency). If the words that are frequently input by the user is not interlinked or synchronized with the data of a wearable device, predictive functions on the wearable device may be inoperative. As a result, the user may be required to manually input each and every word, causing inconvenience.

Because wearable devices, such as smartwatches, include smaller displays, this inconvenience is magnified by the difficulty of manipulation. The user may thus encounter difficulty in registering, altering and deleting frequently used words. If the device registers frequent usage of other data (e.g., shortcuts), the user may experience the same difficulty in registering, altering and deleting frequency usage of that other data as well.

An electronic device, according to certain embodiments, includes: communication circuitry; a display; a memory storing instructions; and a processor, operably coupled to the communication circuitry, the display and the memory, wherein the instructions are executable by the processor to cause the electronic device to: establish a communicative connection to an external device via the communication circuitry, receive, via the communicative connection, auto-complete text input information from the external device, store the received auto-complete text input information in the memory, for usage with a keyboard process of the electronic device, and control the display to display a recommended word, based on the stored auto-complete text input information, wherein the auto-complete text input information includes at least one of: user data including complete words for recommendation as predictive text, generated from collecting and applying artificial-intelligence (AI) self-learning on words frequently utilized by a user, and user-defined text shortcuts configured by the user which associate an incomplete input with a completed word for usage as the predictive text.

An auto-complete text input method, according to certain embodiments, includes: establishing, by control of a processor, a communicative connection to an external device via communication circuitry; receiving via the communicative connection, auto-complete text input information from the external device; storing, in a memory, the received auto-complete text input information, for usage with a keyboard process of the electronic device; and displaying, via a display, a recommended word, based on the stored auto-complete text input information, wherein the auto-complete text input information includes at least one of: user data including complete words for recommendation as predictive text, generated from collecting and applying artificial-intelligence (AI) self-learning on words frequently utilized by a user, and user-defined text shortcuts configured by the user which associate an incomplete input with a completed word for usage as the predictive text.

According to certain embodiments, some words are frequently input by a user to an external device (such as, for example, a smartphone), which may be used to collect typing habits of the user, so as to provide predictive text. Furthermore, other interlinked devices (e.g., a smartwatch) may often provide typing capability. Accordingly, to increase user convenience, predictive text capability may be provided on the smartwatch. It would be advantageous for the smartwatch to take advantage of the predictive text data acquisition of the external device.

When predictive text data is shared between the external device and the local device (e.g., a smartwatch), improved predictive text capability may be provided by the local device (e.g., a smartwatch), thereby increasing user convenience.

According to certain embodiments, the provision of an identical predictive text experience on both an external device (e.g., a smartphone) and a local device (e.g., a smartwatch) may benefit the user experience on the local device, especially when it is equipped with a smaller display, and user manipulations are more difficult and inconvenient as a result. Thus, the disclosed invention may improve the user experience on such devices.

BRIEF DESCRIPTION OF DRAWINGS

FIGS. 5A and 5B show a process of word inputting in a wearable device 5 according to a comparative embodiment.

FIGS. 9A, 9B, and 9C illustrate a process of synchronizing a user word in an electronic device according to certain embodiments and the result thereof.

DETAILED DESCRIPTION

Figure 1:
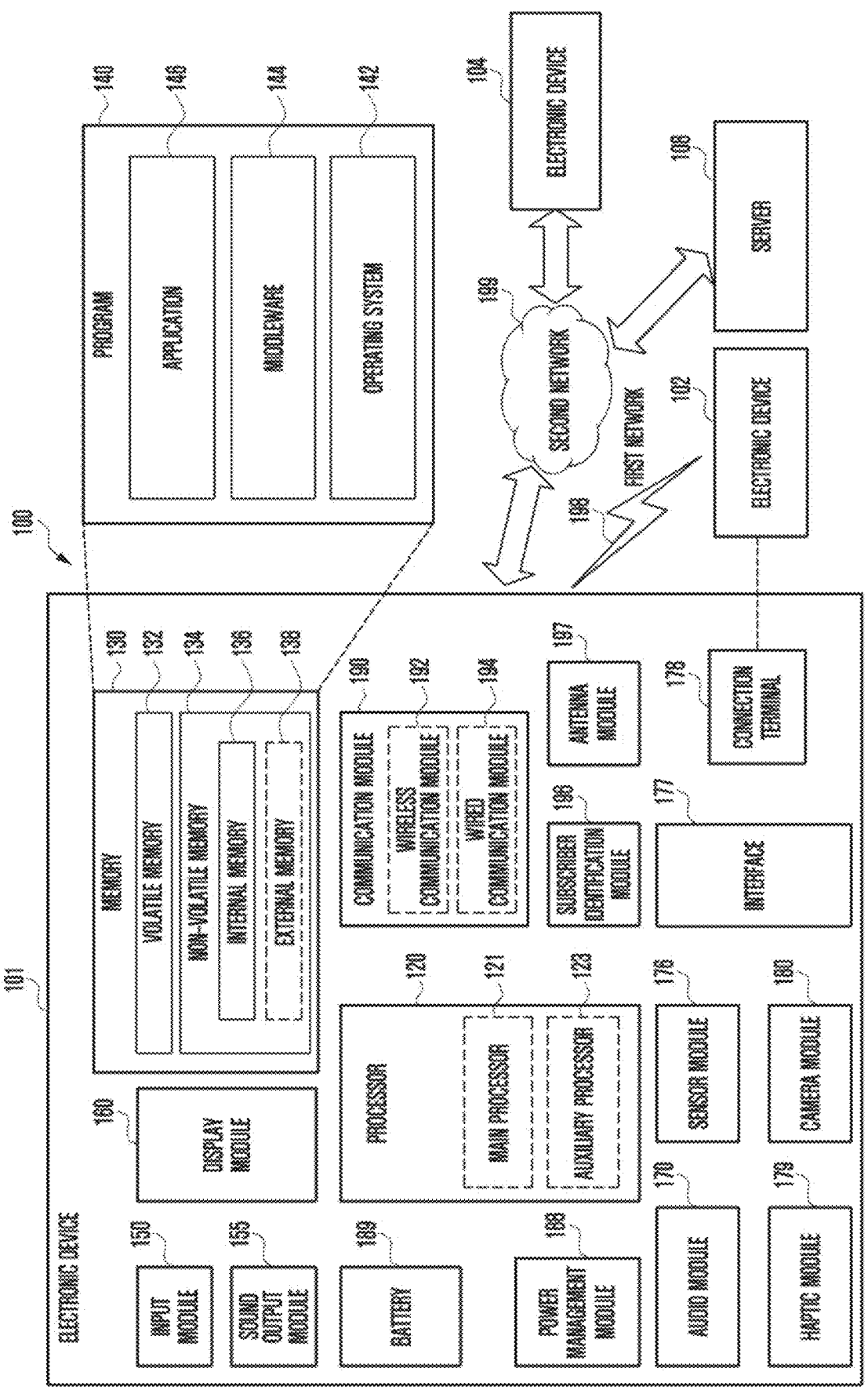
FIG. 1 is block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the 5 auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various 5 requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
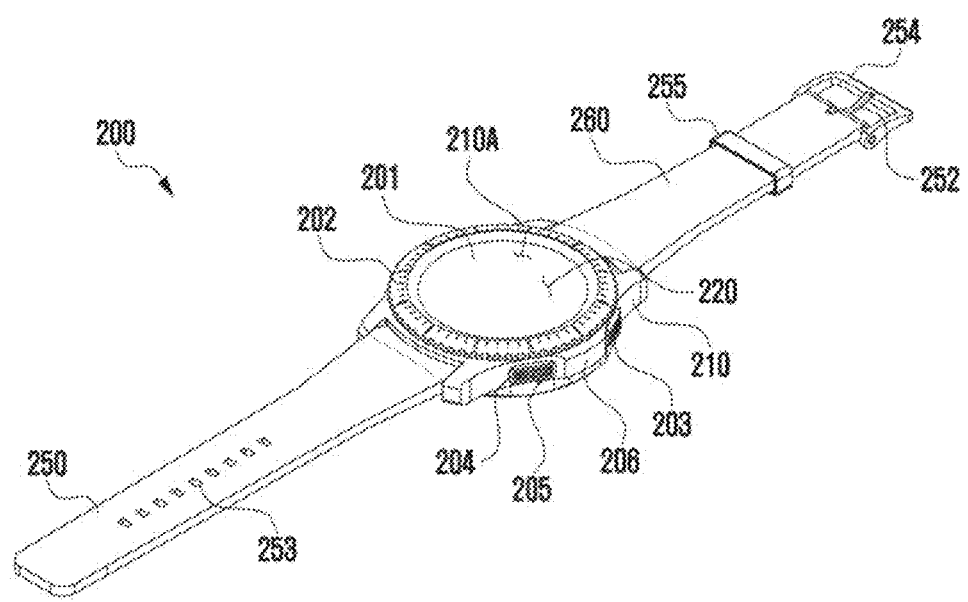
FIG. 2A is a front perspective view of an electronic device according to certain embodiments.
Figure 2B:
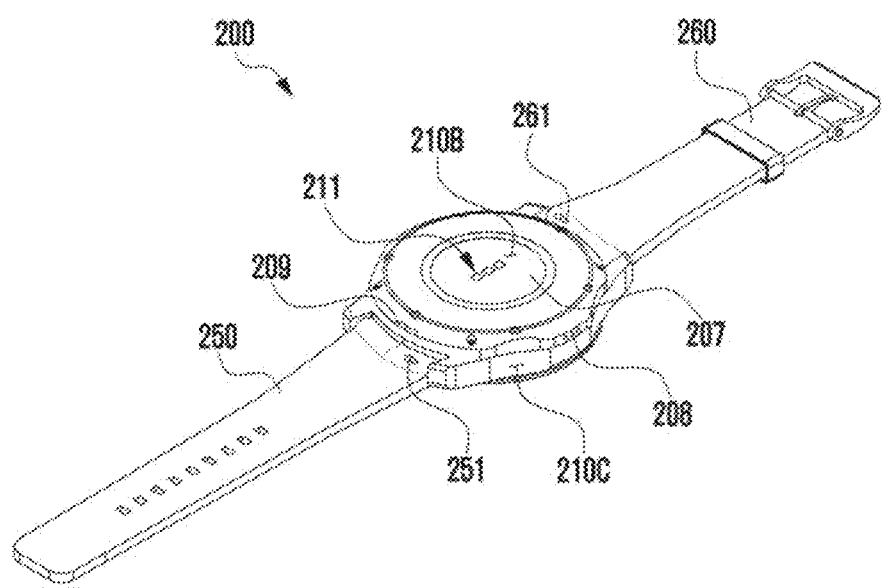
FIG. 2B is a rear perspective view of an electronic device according to certain embodiments.

FIG. 2A is a front perspective view of an electronic device according to certain embodiments, and FIG. 2B is a rear perspective view of the electronic device according to certain embodiments.

Referring to FIGS. 2A and 2B, an electronic device 200 (e.g., the electronic device 101 in FIG. 1) according to certain embodiments may include a housing 210 including a first surface (or a front surface) 210A, a second surface (or a rear surface) 210B, and a side surface 210C surrounding a space between the first surface 210A and the second surface 210B, and binding members 250 and 260, each of which is connected to at least a part of the housing 210 so as to allow the electronic device 200 to be attached/detached to/from a user's body (e.g., a wrist, an ankle, etc.). In another embodiment (not shown), the housing may indicate a structure forming some among the first surface 210A, the second surface 210B, and the side surface 210C in FIG. 2.

According to an embodiment, the first surface 210A may be formed of a front plate 201 (e.g., a polymer plate, or a glass plate including various coated layers) which is at least partially transparent. The second surface 210B may be formed of a rear plate 207 which is substantially opaque. The rear plate 207 may be formed of, for example, coated or colored glass, ceramic, polymer, metal (e.g., aluminum, stainless steel (STS), or magnesium), or a combination of at least one two of the above-mentioned materials. The side surface 210C may be formed of a side bezel structure (or "a side member") 206 coupled to the front plate 201 and the rear plate 207 and containing metal and/or polymer. In an embodiment, the rear plate 207 and the side bezel structure 206 may be integrally formed, and may contain an identical material (e.g., a metal material such as aluminum). The binding members 250 and 260 may be formed of various materials and in various forms. Integrated and multiple unit links may be formed of a woven material, leather, rubber, urethane, metal, ceramic, or a combination of at least two of the above-mentioned materials so as to be movable with each other.

According to certain embodiments, the electronic device 200 may include at least one among a display 220 (e.g., the display module 160 in FIG. 1), audio modules 205 and 208 (e.g., the audio module 170 in FIG. 1), a sensor module 211 (e.g., the sensor module 176 in FIG. 1), key input devices 202, 203, and 204 (e.g., the input module 150 in FIG. 1), and a connector hole 209. In an embodiment, in the electronic device 200, at least one (e.g., the key input devices 202, 203, and 204, the connector hole 209, or the sensor module 211) of the elements may be omitted, or another element may be additionally included.

The display 220 may be exposed through, for example, a considerable part of the front plate 201. The shape of display 220 may correspond to the shape of the front plate 201, and may be various shapes such as a circular shape, an elliptical shape, or a polygonal shape. The display 220 may be coupled to or disposed adjacent to a touch sensing circuit, a pressure sensor capable of measuring the strength (pressure) of a touch, and/or a fingerprint sensor.

The audio modules 205 and 208 may include a microphone hole and a speaker hole. A microphone for acquiring an external sound may be disposed in the microphone hole. In an embodiment, multiple microphones may be disposed so as to sense the direction of a sound. The speaker hole may be used as an external speaker or a call receiver.

The sensor module 211 may generate an electrical signal or a data value corresponding to the state of an operation inside the electronic device 200 or the state of an environment outside the electronic device 200. The sensor module 211 may include, for example, a biosensor module 211 (e.g., a heart rate monitoring (HRM) sensor) disposed in the second surface 210B of the housing 210. The electronic device 200 may further include, at least one of unillustrated sensor modules, such as, a gesture sensor, a gyro sensor, a barometric sensor, a magnetic sensor, an acceleration sensor, a grip sensor, a color sensor, an infrared (IR) sensor, a biosensor, a temperature sensor, a humidity sensor, or an illumination sensor.

The key input devices 202, 203, and 204 may be disposed in the first surface 210A of the housing 210, and may include a wheel key 202 rotatable in at least one direction and/or side key buttons 202 and 203 disposed in the side surface 210C of the housing 210. The wheel key may have a shape corresponding to the shape of the front plate 201. In another embodiment, the electronic device 200 may not include some or all of the key input devices 202, 203, and 204, and the key input devices 202, 203, and 204, which are not included, may be implemented in other forms, such as a soft key, on the display 220. The connector hole 209 may receive a connector (e.g., a USB connector) for transmitting or receiving power and/or data to or from an external electronic device, and may include another connector hole (not shown)

capable of receiving a connector for transmitting or receiving audio signals to or from an external electronic device. The electronic device 200 may further include, for example, a connector cover (not shown) for covering at least a part of the connector hole 209 and blocking introduction of outside foreign matter into the connector hole.

The binding members 250 and 260 may be detachably bound to at least a partial region of the housing 210 by using locking members 251 and 261. The binding members 250 and 260 may include at least one among a fixing member 252, a fixing member fastening hole 253, a band guide member 254, and a band fixing ring 255.

The fixing member 252 may be configured to fix the housing 210 and the binding member 250 and 260 to a part (e.g., a wrist, an ankle, etc.) of the user's body. The fixing member fastening hole 253 may correspond to the fixing member 252, and may fix the housing 210 and the binding members 250 and 260 to a part of the user's body. The band guide member 254 may be configured to restrict the range of movement of the fixing member 252 when the fixing member 252 is fastened to the fixing member fastening hole 253, and thus may tightly bind the binding members 250 and 260 on the part of the user's body. The band fixing ring 255 may restrict the range of movement of the binding member 250 and 260 while the fixing member 252 is fastened to the fixing member fastening hole 253.

Figure 3:
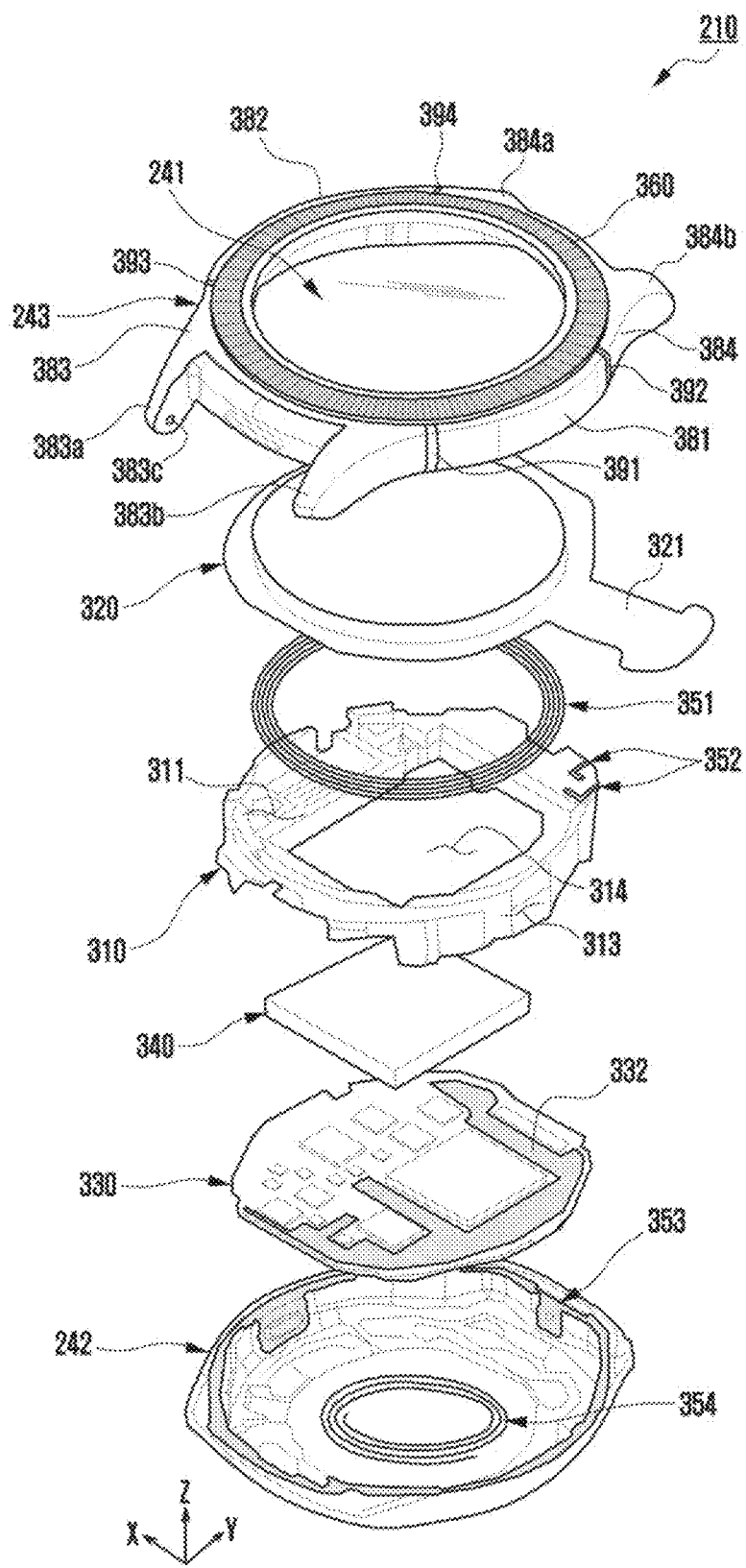
FIG. 3 is an exploded perspective view of a body 210 of an electronic device 200 in FIG. 2A according to an embodiment.

FIG. 3 is an exploded perspective view of a body 210 of the electronic device 200 in FIG. 2A according to an embodiment.

Referring to FIG. 3, the body 210 of the electronic device 200 may include a front cover 241, a rear cover 242, a side member 243, a support member (e.g., a bracket) 310, a display 320, a printed circuit board 330, a battery 340, or multiple conductive patterns 351, 352, 353, and 354. At least one of the elements of the body 210 may be identical or similar to at least one of the elements included in the body 210 in FIG. 2A or 2B, and a redundant description thereof will be omitted.

According to an embodiment, the support member 310 may be disposed between the front cover 241 and the rear cover 242. The display 320 may be disposed on one surface 311 of the support member 310 facing the front cover 241. The printed circuit board 330 may be disposed on the other surface (not shown) of the support member 310 facing the rear cover 242. The display 320 and the printed circuit board 330 may be supported by the support member 310 to ensure rigidity. The support member 310 may be formed of, for example, a metal material and/or a nonmetal material (e.g., polymer).

According to an embodiment, the display 320 may be disposed between the 5 front cover 241 and the support member 310. The display 320 may be implemented based on various light-emitting elements such as an organic light-emitting diode (OLED). According to certain embodiments (not shown), the display 320 may include a touch sensing circuit (e.g., a touch sensor). The touch sensing circuit may be implemented as a transparent conductive layer (or film) based on various conductive materials such as indium tin oxide (ITO). According to an embodiment, the touch sensing circuit may be disposed between the front cover 241 and a polarizing layer (not shown) (e.g., an add-on type). According to another embodiment, the touch sensing circuit may be disposed between the polarizing layer and a light-emitting layer (e.g., a layer including multiple pixels implemented as light-emitting elements such as OLEDs) (e.g., an on-cell type). According to another embodiment, the light-emitting layer may include a touch sensing circuit or a touch sensing function (e.g., an in-cell type). According to certain embodiments (not shown), the display 320 may further include a pressure sensor capable of measuring the strength (pressure) of a touch.

According to an embodiment, the display 320 may include an electrical path such as flexible printed circuit (FPCB) 321 for electrical connection to the printed circuit board 330. For example, the FPCB 321 may be disposed in a bent form so as to be electrically connected to the printed circuit board 330 through a space between the side surface 313 of the support member 310 and the side member 243. A processor, a memory, and/or an interface may be mounted on the printed circuit board 330. The processor may include at least one among for example, a central processing unit, an application processor, a graphics processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, an SD card interface, and/or an audio interface. The interface may electrically or physically connect, for example, the body 210 to an external electronic device, and may include a USB connector, an SD card/MMC connector, or an audio connector. For example, a connector hole for electrical connection to the external electronic device may be formed in the side member 243 or the rear cover 242.

Figure 4:
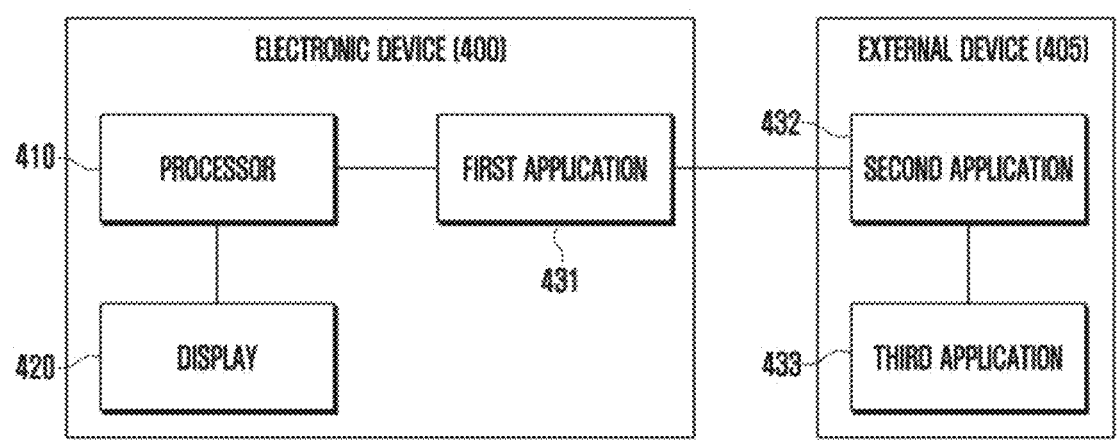
FIG. 4 is a block diagram showing elements of an external device and an electronic device according to certain embodiments.

FIG. 4 is a block diagram showing elements of an external device and an electronic device according to certain embodiments.

According to certain embodiments, an electronic device 400 may include a processor 410, a display 420, and a first application 431, and some of the illustrated elements may be omitted or replaced. The electronic device 400 may further include at least some of the elements and/or functions of the electronic device 200 in FIG. 2. At least some of the illustrated (or unillustrated) elements of the electronic device 400 may be operatively, functionally, and/or electrically connected to each other.

According to certain embodiments, the processor 410 is an element capable of controlling each element of the electronic device and/or performing data processing or calculation about communication, and may include one or more processors 410. The processor 410 may include at least some of the elements and/or functions of the processor 120 in FIG. 1.

According to certain embodiments, calculation and data processing functions, which the processor 410 may implement in the electronic device, are not limited. However, hereinafter, features related to communication with an external device 405 will be described in detail. Operations of the processor 410 may be performed by loading instructions stored in a memory (not shown).

According to certain embodiments, the first application 431 may communicate, under control of the processor 410, with the external device through a wireless network. The first application 431 may include hardware and software modules for transmitting and receiving data to and from a cellular network (e.g., a long term evolution (LTE) network, a 5G network, or a new radio (NR) network) and a short-range network (e.g., Wi-Fi or Bluetooth). The first application 431 may include at least some of the elements and/or functions of the communication module 190 in FIG. 1.

According to certain embodiments, the display 420 may display various images according to control of the processor 410. The display 420 may be implemented as one among a liquid crystal display (LCD), a light-emitting diode (LED)

display, or an organic light-emitting diode (OLED) display, but is not limited thereto. The display 420 may be formed as a touch screen for sensing a touch input and/or a proximity touch (or hovering) input using a part (e.g., a finger) of a user's body or an input device (e.g., a stylus pen). The display 420 may include at least some of the elements and/or functions of the display module 160 in FIG. 1.

According to certain embodiments, the external device 405 may include a second application 432 and a third application 433. The external device 405 may be illustrated as a smartphone in FIGS. 6 to 9, but is not limited thereto, and may include a mobile terminal including a flexible display (e.g., a slidable, foldable, or rollable display). The external device 405 may further include at least some of the elements and/or functions of the electronic device 101 in FIG. 1. At least some of the illustrated (or unillustrated) elements of the external device 405 may be operatively, functionally, and/or electrically connected to each other.

According to certain embodiments, the second application 432 may communicate, under control of a processor (not shown) of the external device, with the electronic device 400 through a wireless network. The second application 432 may include hardware and software modules for transmitting and receiving data to and from a cellular network (e.g., a long term evolution (LTE) network, a 5G network, a new radio (NR) network) and a short-range network (e.g., Wi-Fi or Bluetooth). The second application 432 may include at least some of the elements and/or functions of the communication module 190 in FIG. 1.

According to certain embodiments, the second application 432 may perform a fetch operation. The fetch operation may include at least one among a first operation (e.g., a text shortcut operation), a second operation (e.g., a user data model collection operation), or a third operation (e.g., a query transfer operation). Here, the first operation may be an operation of preparing collection of text shortcut data defined by a user. The second operation may be an operation of preparing collection of user data. The third operation may be an operation of making a request to the third application 433 for the text shortcut data, defined by the user, and/or the user data. A query may be an act of making a request to a server or a database for information.

According to certain embodiments, the third application 433 may transmit a first content to the second application 432 in response to the fetch operation of the second application 432. The first content may include user data and/or user-defined text shortcut data. The user data may be data recommended as a completed word by a program collecting and self-learning data on a word which is frequently used but not separately defined in setting by the user. Furthermore, the user-defined text shortcut data may be data including a text shortcut configured by a user and a completed word corresponding to the text shortcut.

According to certain embodiments, the second application 432 may receive a transmission signal from the third application 433, and may determine whether there is the first content. When there is the first content, the second application 432 may use a file uniform resource identifier ("fileuri") to receive the first content from the third application 433. The fileuri may be a unique identifier of a first content file. The second application 432 may transfer the received first content to the first application 431.

According to certain embodiments, the first application 431 of the electronic device 400 may receive the first content from the second application 432, and may synchronize the same. The processor 410 may synchronize the first content and may display the synchronized first content on the display 420. Furthermore, the processor 410 may perform control such that the first content stored in the external device 405 may be used in the electronic device 400. Furthermore, on the electronic device 400, due to the relatively small size of the display 420, it may be difficult to perform work for registering, correcting, or deleting a user learning word and/or a user-defined text shortcut. The electronic device 400 may use the first application 431 to perform, on the external device 405, work for registering, correcting, or deleting a user learning word and/or a user-defined text shortcut, and may synchronize and use the same on the electronic device 400.

According to certain embodiments, the processor 410 may connect the external device 405 to the electronic device 400, may acquire, auto-complete text input information linkable with an application from the external device 405, may synchronize the acquired auto-complete text input information with the first application 431, and may control the display 420 to display a recommended word based on the auto-complete text input information.

According to certain embodiments, when the auto-complete text input information is changed on the external device 405, the processor 410 may recognize a changed content, and may transfer the changed content to the electronic device 400 in real time.

Figure 5A:
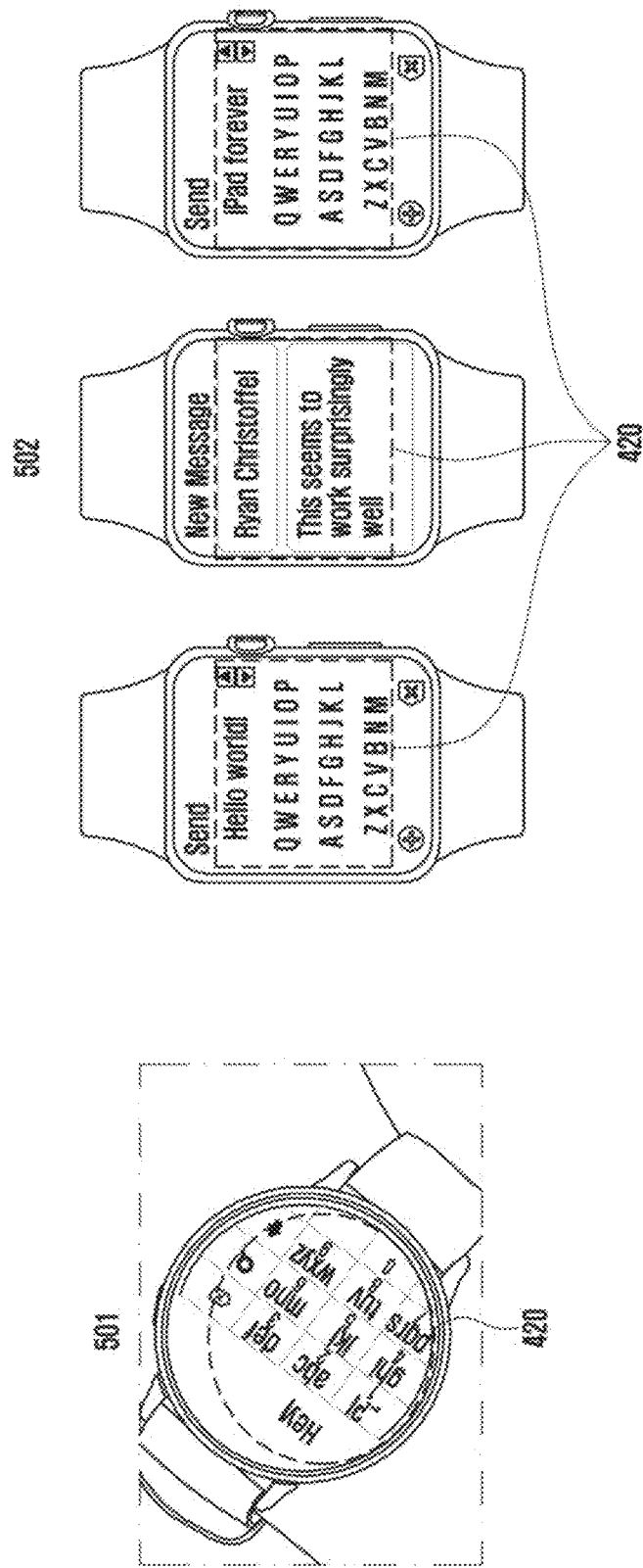

FIGS. 5A and 5B show a process of word inputting in a wearable device according to a comparative embodiment.

According to FIG. 5A, an electronic device 501 may be a wearable device, such as a smartwatch as depicted, that may be worn on the body of a user. The electronic device 501 may include the display 420, and may receive a user's touch input so as to generate inputs of letters and words. The shape of the display 420 is not limited to a circular shape like the example electronic device 501, and may include various shapes, in addition to a tetragonal shape like an electronic device 502. However, the display 420 may be implemented at a relatively small size compared with a display of a comparable smartphone or a tablet PC, due to the form factors associated with watches. Due to the small size of the display 420, it may be difficult for the user to input words and letters using on-screen keyboards. Furthermore, the user's habits with respect to input of words and textual shortcuts may not be recorded in the wearable device, resulting in an inability to aggregate usage information that could be used to provide predictive text. In this case, even when the user inputs a frequently-used word or words, the user may nonetheless experience inconvenience in that they will be required input an entirety of the letters forming the word, using the small display 420, due to the absence of predictive text function and data collection.

According to FIG. 5B, the external device 405 may display a first content in a keyboard 510 of a terminal. The first content may include user-defined text shortcut data, in which words or text shortcuts used by the user are stored, and/or user data, which is aggregated through artificial-intelligence enabled self-learning based on words frequently input by the user. Accordingly, the first content may include display of recommended words as predictive text. For example, when the user inputs a word "Sam" on the external device 405, the external device 405 may display, in a recommendation region 520b, words or text predictions operable as shortcuts, such as "Samsung Electronics, Samsung, and SamElectro" which had been used previously by the user. Alternatively, when the user defines the word "Sam" as a text shortcut of words "Samsung Electronics, Samsung, and SamElectro", the external device 405 may display text shortcuts preconfigured by the user in the recommendation region 520b. Subsequently, the external device 405 may display, in a word display region 530 (e.g., an input field), a predictive word after selection by the user. Therefore the user does not need to laboriously enter an entirety of a word during message composition, but can select it from predictive text instead based on entry of a related string.

However, the electronic device 400 in FIG. 5B may not be synchronized with the external device 405 with respect to predictive text and associated data. Accordingly, the electronic device 400 cannot present the same predictive text or shortcuts, such as "Samsung Electronics, Samsung, and SamElectro," in the corresponding recommendation region 520a. Furthermore, owing to the lack of synchronization, predictive text may be different between the two devices (e.g., "I", "AH," "TODAY"). 'Accordingly, the user may be inconvenienced when composing messages on the smaller device 400, as opposed to the larger device 405.

The electronic device 400 herein may synchronize predictive text data (e.g., user word data) with the external device 405, so as to provide the same recommended word and user experience as the external device 405. Hereinafter, a description will be made of the electronic device 400 for synchronizing user word data with the external device 405 and an auto-complete text input method by the electronic device 400.

According to an embodiment, in FIGS. 5A to 9B, the electronic device 400 is illustrated as a wearable device, and the external device 405 is illustrated as a smartphone. However, certain embodiments may not be limited thereto. The electronic device 400 and the external device 405, as illustrated in FIG. 2, may include various devices capable of wirelessly communicate with each other. In one example, the electronic device 400 may be a wearable device worn on a user, and the external device 405 may be a smartphone which is being operated by the user. In another example, the electronic device 400 may be TV or a display device, and the external device 405 may be a smartphone which is being operated by the user. Certain embodiments thereof will be described with reference to FIGS. 12A to 12E.

Figure 6:
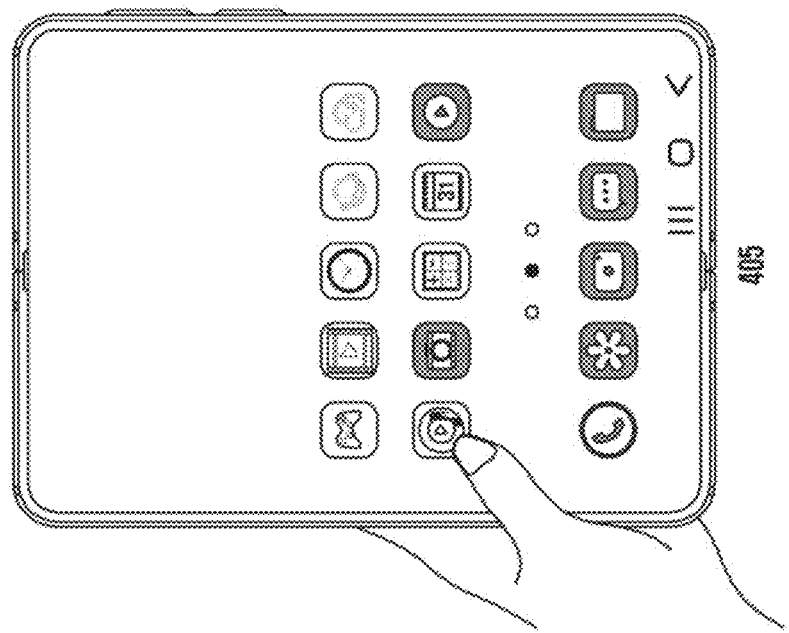
FIG. 6 illustrates a situation of using an electronic device according to certain embodiments to initiate a connection service with an external device 405.
Figure 6:
Figure 6:
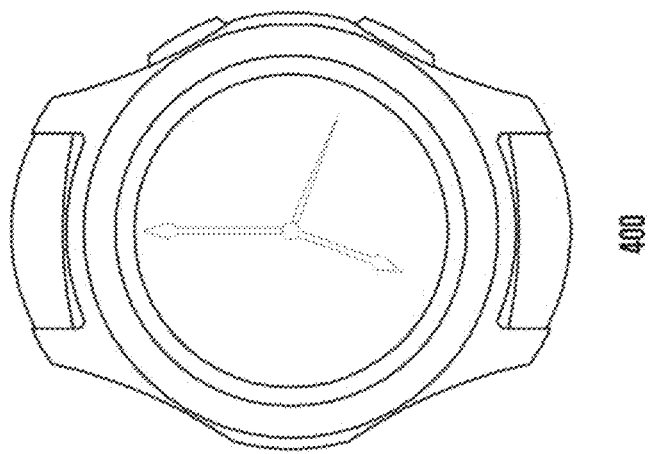

FIG. 6 illustrates a situation of using an electronic device according to certain embodiments to initiate a connection service with an external device 405.

According to an embodiment, as illustrated in FIG. 6, a user may use the electronic device 400 to execute an application related to wireless connection establishment. The electronic device 400 may provide a user interface (or an execution screen) related to the application through the display 420 in response to the user's request for execution of an application. According to an embodiment, the electronic device 400 may search, based on the application execution, for an external device 405 (e.g., either through an active operation or a background operation), and may provide, to the user, a user interface indicating discovered devices, such as the external device 405, in the form of a list.

According to an embodiment, the user may select the external device 405, to attempt establishment of a communication connection to the external device 405, via the user interface. For example, the user may select (e.g., touch), in the list, an icon corresponding to a specific external device 405 to execute a connection service 600 with the specific external device 405 (e.g., a first connection method). According to an embodiment, with respect to the specific external device 405, the user may directly connect processes, or may indirectly execute the connection service 600 through an intermediate process (e.g., the second application 432 in FIG. 4).

In an embodiment, the first connection method may include, for example, a method by which the user designates one external device among discovered external devices and directly connects an input function process of the designated external device 405 to an input function process of the electronic device 400. In an embodiment, a second connection method may be, for example, a method by which the user designates one external device among discovered external devices and indirectly connects with the designated external device by using an intermediate process (e.g., the second application 432 in FIG. 4).

According to an embodiment, when the user requests establishment of a communication connection 600 with the external device 400 via the input, the electronic device 400 may transmit an invitation to the external device 405, and may receive a response message corresponding to the invitation message from the external device 405. According to an embodiment, when the response message is received from the external device 405, the electronic device 400 may provide, to the user, a first user interface which may include a guide for prompting the user to move into a proximity to the external device for establishing a communicative connection.

Figure 7A:
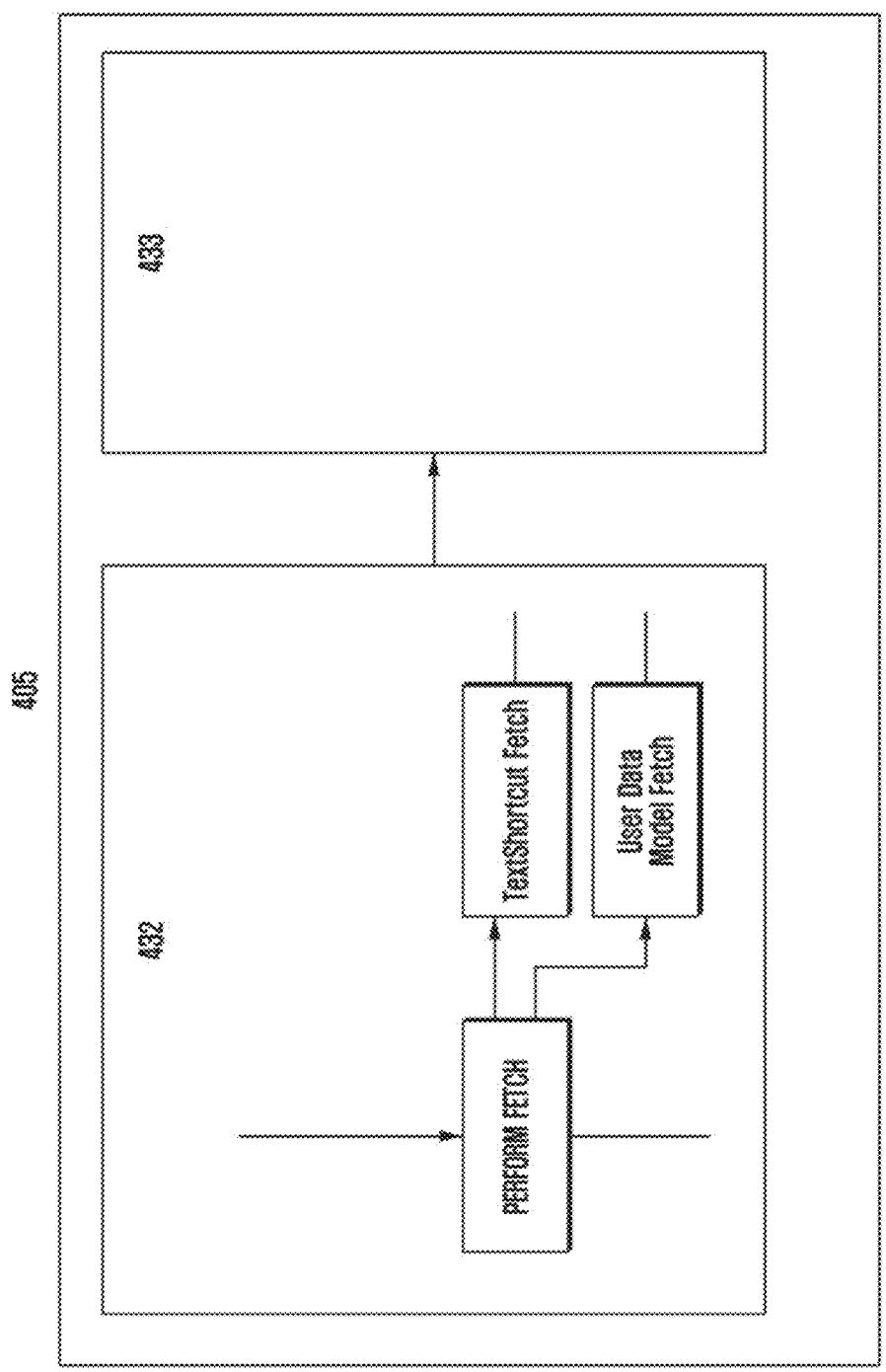
FIGS. 7A, 7B and 7C show a process of transmitting and receiving user word data between an external device and an electronic device according to certain embodiments.
Figure 7B:
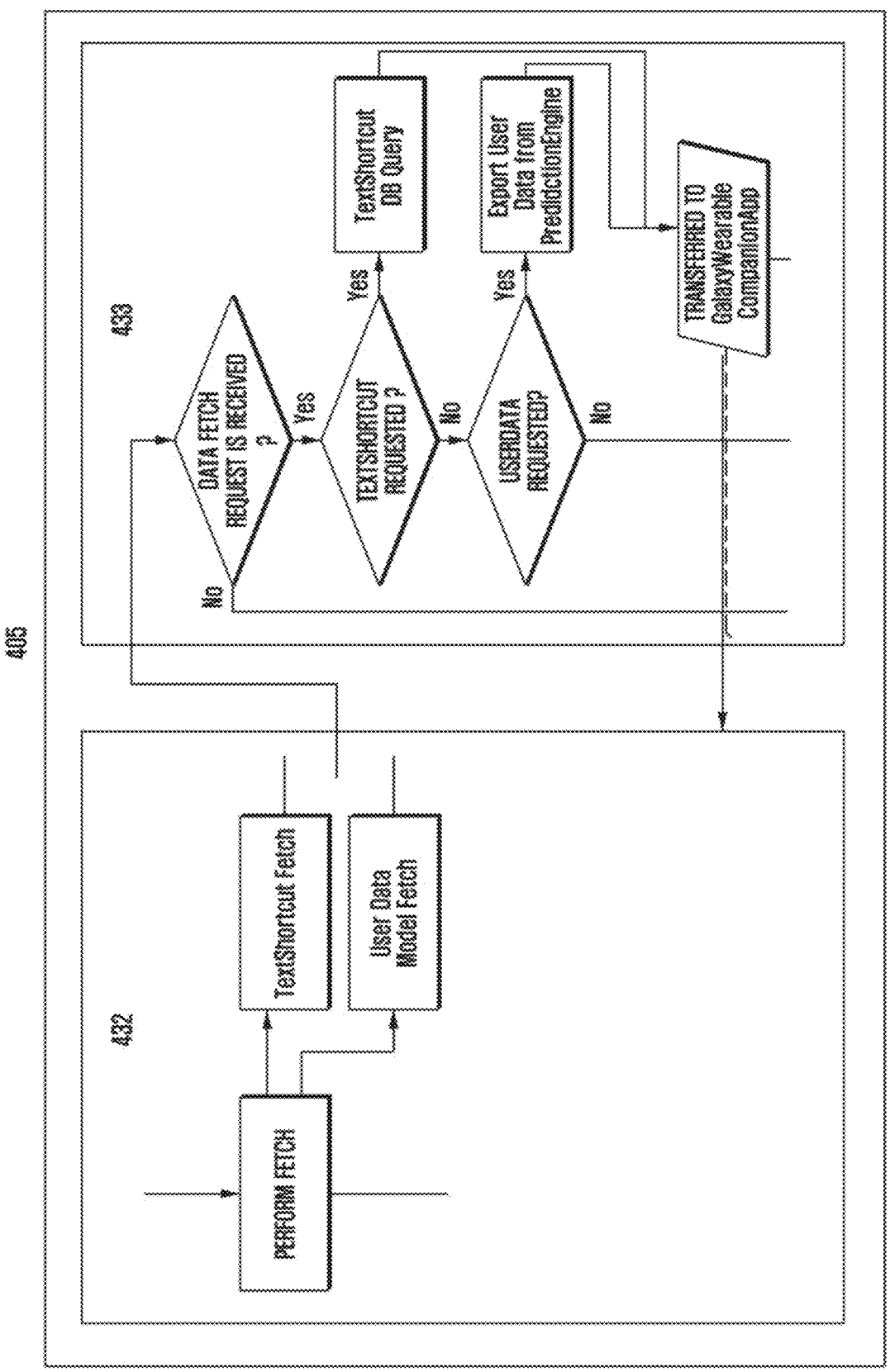
Figure 7C:
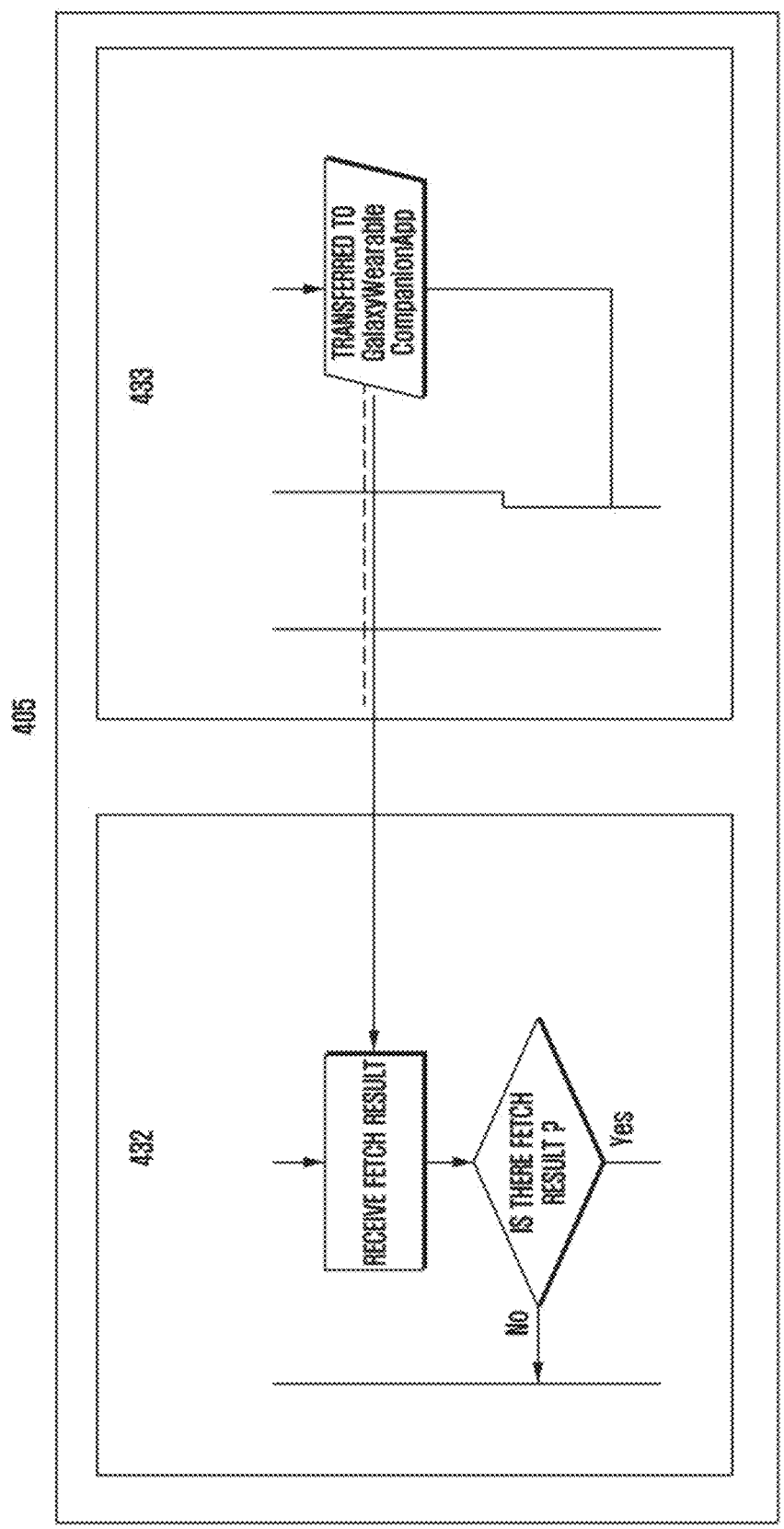

FIGS. 7A to 7C show a process of transmitting and receiving user word data between an external device and an electronic device according to certain embodiments.

According to FIG. 7A, the second application 432 on the external device 405 may perform a fetch operation. The fetch operation may include at least one among a first operation (e.g., a text shortcut operation), a second operation (e.g., a user data model collection operation), or a third operation (e.g., a query request transfer operation). Each operation has been described above, with respect to FIG. 4.

According to certain embodiments, the third application 433 may transmit the first content to the second application 432, in response to the fetch operation of the second application 432. The first content may include user data and/or user-defined text shortcut data. The user data may include predictive text data that is aggregated via a program that monitors the user's composition habits in terms of frequently used words, via, for example, artificial intelligent based self-learning may be applied. Furthermore, the user-defined text shortcut data may indicate a text shortcut configured by a user and a completed word corresponding to the text shortcut.

According to FIG. 7B, the third application 433 of the external device 405 may determine whether a request for a fetch operation is generated from the second application 432. When the request for a fetch operation is extant, the third application 433 may first determine whether a request for processing a user-defined text shortcut is extant. When there is a request for processing a user-defined text shortcut is extant, the third application 433 may utilize a database (DB) of user-defined text shortcuts to transmit requested user-defined text shortcut data to the second application 432.

Alternatively, when no request for processing user-defined text shortcut information has been generated, but a request for user data is extant, the third application 433 may extract the user data from a prediction engine, and transmit the extracted user data to the second application 432.

According to FIG. 7C, the third application 433 may include transmission of a first content in response to the fetch operation, for which a request is made to the second application 432. The second application 432 may receive a transmission signal from the third application 433, and may determine whether there is the first content. When the first content is extant, the second application 432 may use a file uniform resource identifier ("fileuri") to receive the first content from the third application 433. The fileuri may include a unique identifier of a first content file. The second application 432 may use a specific function (e.g., toAsset( )) to convert the received first content such that the received the first content may be transferred to the first application 431. The specific function (e.g., toAsset( )) may be used when grouping big data into small-sized data. The second application 432 may include, in specific units (e.g., asset units), the first content including a large amount of information of file units. The second application 432 may transfer a made group of the specific units (e.g., asset units) to the first application 431. The first application 431 may receive the first content in the asset units.

According to certain embodiments, the second application 432 may perform a fetch operation. The fetch may include at least one among a first operation (e.g., a text shortcut operation), a second operation (e.g., a user data model collection operation), or a third operation (e.g., a query request transfer operation).

According to certain embodiments, the third application 433 may transmit the first content to the second application 432 in response to the fetch operation of the second application 432. The first content may include user data and/or user-defined text shortcut data. According to certain embodiments, the first application 431 of the electronic device 400 may receive the first content from the second application 432, and may synchronize the same. The processor 410 may synchronize the first content, and may display the same on the display 420.

Figure 8:
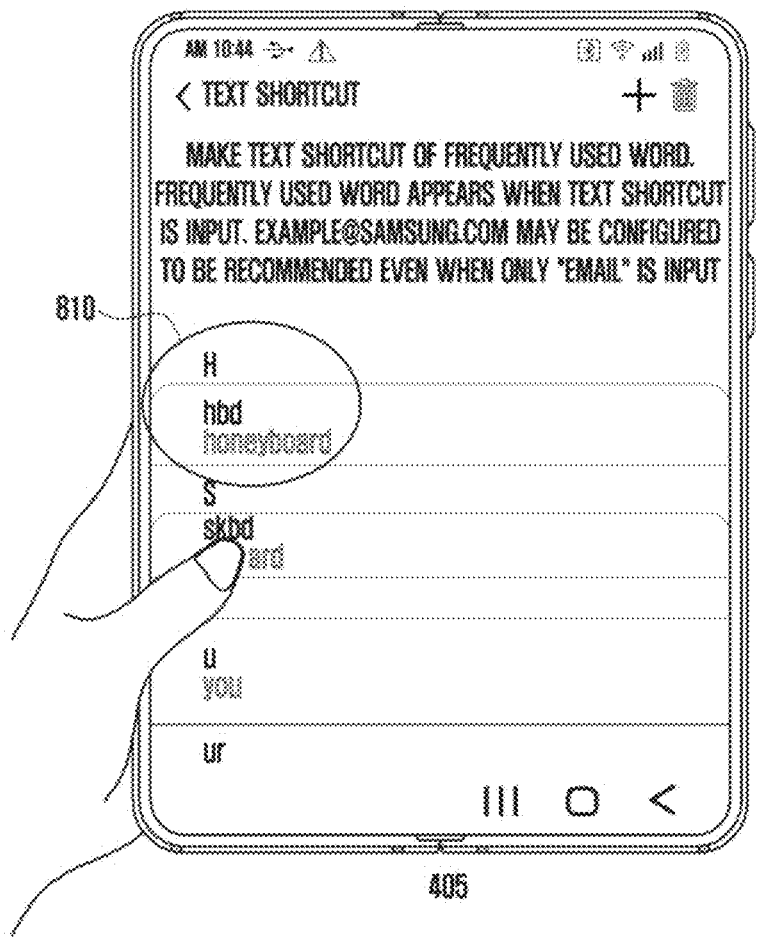
FIG. 8 illustrates a text shortcut input screen of an external device according to certain embodiments.

FIG. 8 illustrates a text shortcut input screen of an external device according to certain embodiments.

According to an embodiment, the external device 405 may store text shortcuts predefined by a user. According to FIG. 810, in a situation in which a user has predefined a text shortcut, the external device 405 may present a word corresponding to the text shortcut as predictive text (e.g., a recommended word) to the user, after the user has entered some text string corresponding to the text shortcut (e.g., "hdb"). The user may select the presented predictive word, or may maintain the input text shortcut. For example, the external device 405 may receive a text shortcut of in which "hbd" is reassociated with the full word "honeyboard" from the user, and store the text shortcut. Subsequently, when the user inputs "hbd," "honeyboard" may be recommended to the user as predictive text.

Furthermore, a "keyboard" menu and a "Text shortcuts" menu may be present on the electronic device 400. When the user selects the "Text shortcuts" menu, the electronic device 400 may change to a present screen to a "Text shortcuts" setting page of the external device. The electronic device 400 may then receive stored text shortcut database (DB) information from the external device 405, and may synchronize local a text shortcut DB on the electronic device 400 with the text shortcut DB information received from the external device 405. Furthermore, when text shortcuts DB information of the external device 405 is updated (e.g., by corrections, addition, deletion, or editing of one or more text shortcuts in the external electronic device 405), the electronic device 400 may receive the updated text shortcuts DB information, and may synchronize the same with the local text shortcuts DB stored on the electronic device 400.

Figure 9B:
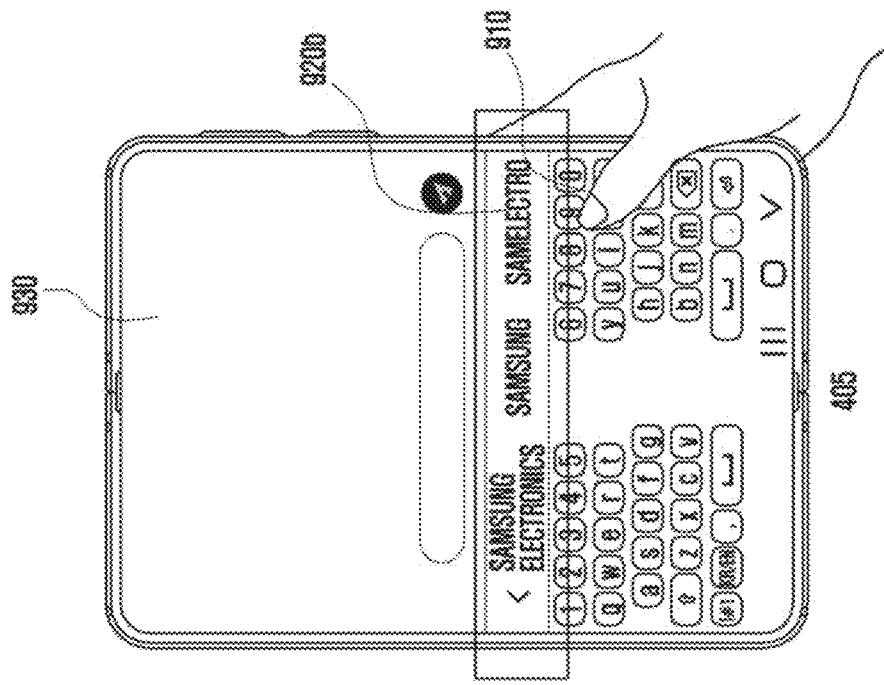
Figure 9B:
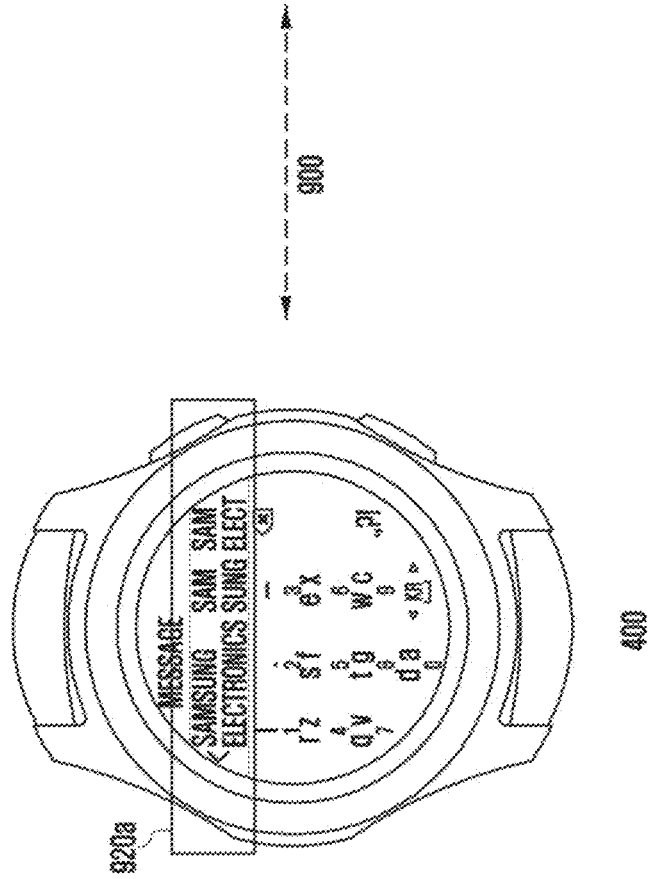
Figure 9C:
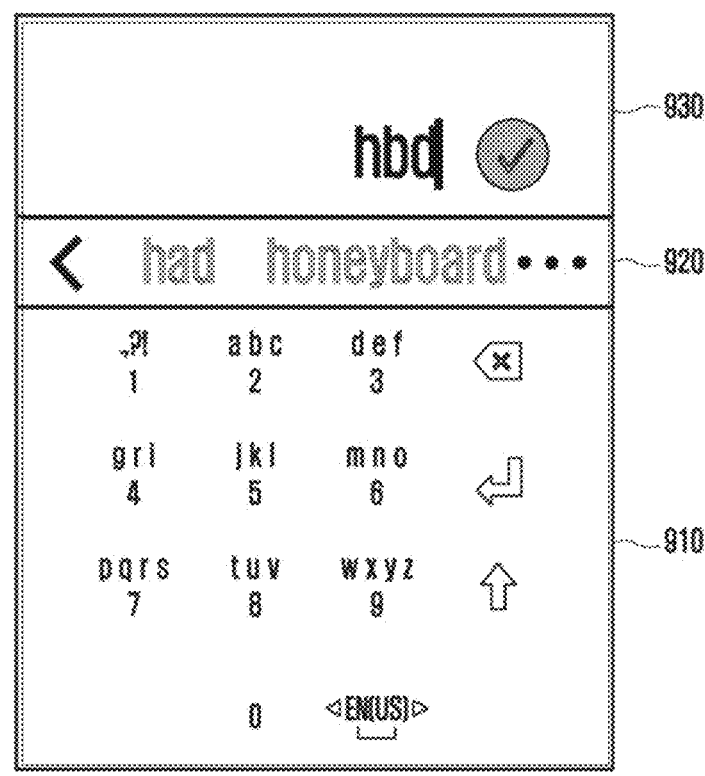

FIGS. 9A to 9C illustrate a process of synchronizing a user word in an electronic device according to certain embodiments and the result thereof.

According to an embodiment, the electronic device 400 may be connected to the external device 405 using a first connection method (e.g., a direction connection) or a second connection method (e.g., an indirect connection). In an embodiment, the first connection method may be a method by which a user designates one external device among discovered external devices and directly connects an input function process of the designated external device 405 with an input function process of the electronic device 400. In an embodiment, the second connection method may be a method by which the user designates one external device among found external devices and indirectly connects with the designated external device by using an intermediate process (e.g., the second application 432 in FIG. 4).

A keyboard of the electronic device 400 may not have a text shortcut management function therein. In this case, the electronic device 400 may receive a text shortcut used in a keyboard of the external device 405, and may use the text shortcut in the keyboard of the electronic device 400. However, it may be difficult to perform direct communication between the keyboard of the electronic device 400 and the keyboard of the external device 405. In this case, communication may be performed using an intermediate process (e.g., a Samsung Galaxy watch "CompanionApp").

According to certain embodiments, the first application 431 of the electronic device 400 may receive a first content from the second application 432, and may synchronize the same.

According to FIG. 9B, the external device 405 may store frequently used words or text shortcuts in association with a keyboard 910 of a terminal, and/or may monitor user inputs to aggregate predictive data on frequently used words and shortcuts, for, via for example AI-assisted self-learning. For example, when the user inputs "Sam" on the external device 405, the external device 405 may present, in a recommendation region 920b, predictive words or text shortcuts, such as "Samsung Electronics, Samsung, and SamElectro" which the user has previously used. Subsequently, after the user selects one of the predictive words, the external device 405 may display the selected predictive word in a display region 930. The electronic device 400 may receive via transmission the first content (e.g., predictive information) from the second application 432, and may synchronize with the same. The electronic device 400, like the external device 405, may present, in a recommendation region 920a, the same predictive words and/or text shortcuts, such as "Samsung Electronics, Samsung, and SamElectro" when the electronic device 400 encounters the same inputs.

According to FIG. 9C, the display of each of the electronic device 400 and the external device 405 may include an input field 930 for displaying input letters, a word recommendation region 920 for completing letters to be input and presenting the same to a user, and a letter keypad region 910. For example, when the user may input the letters "hbd" in the input field 930 by using the letter keypad region 910, the electronic device 400 may use learned user words or text shortcuts to display a completed word "honeyboard" as a recommended word in the word recommendation region 920.

Figure 10:
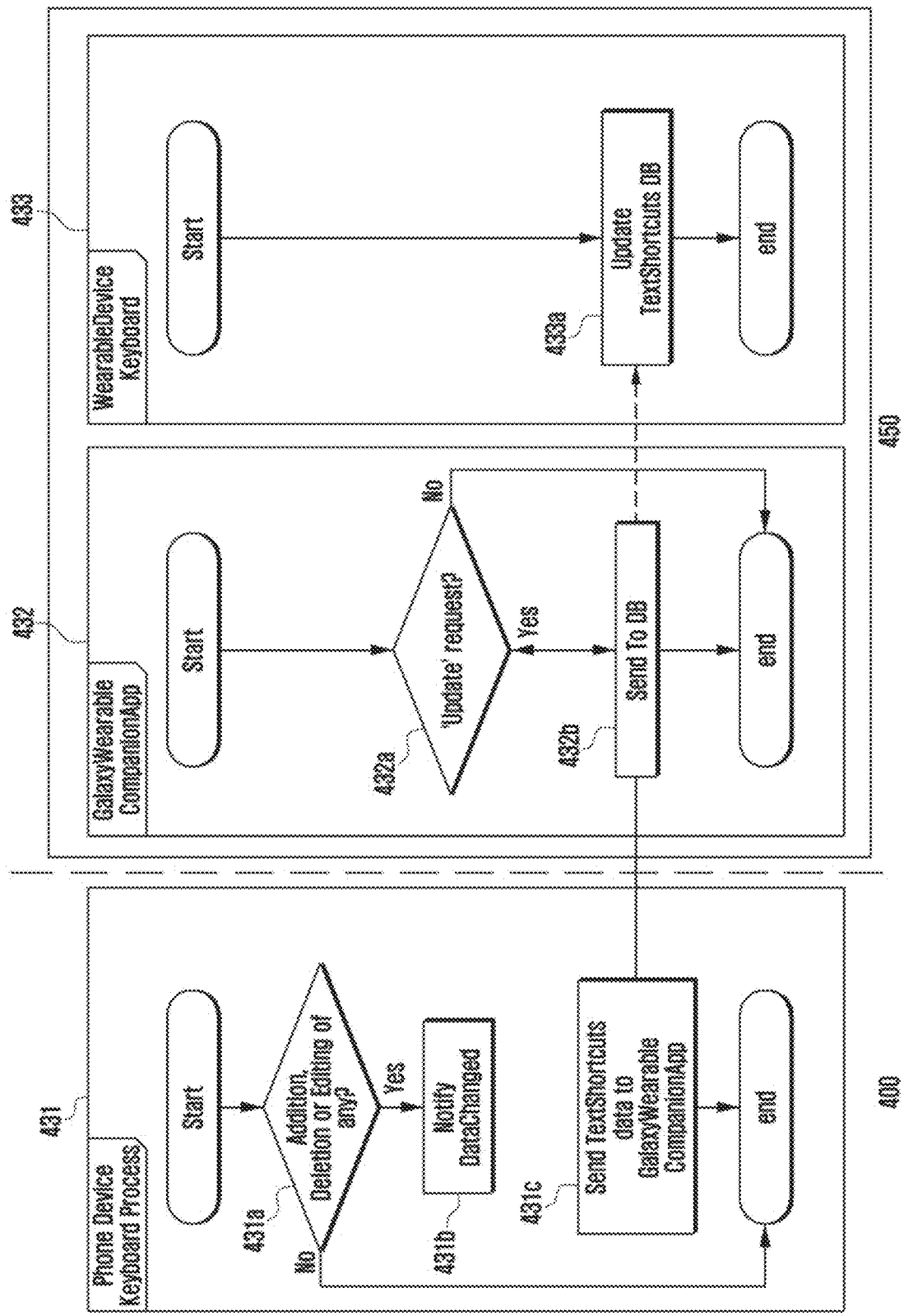
FIG. 10 illustrates a method for changing a text shortcut by an electronic device according to certain embodiments.

FIG. 10 illustrates a method for changing a text shortcut by an electronic device according to certain embodiments.

According to an embodiment, the electronic device 400 may use the first application 431 to acquire a first content (e.g., user-defined text shortcut data or user data) on the external device 405. Furthermore, when the first content of the external device 405 is updated, the electronic device 400 may push the update out to the other device.

For example, the first application 431 may determine whether an update has been generated to the text shortcut data, including deletions or additions to user-defined text shortcuts stored on the external device 405 (e.g., an update), in operation 431a. When there is a deleted or added user-defined text shortcut, the first application 431 may generate a request to the second application 432 for changed user-defined text shortcut data. The second application 432 may receive a request for data from the first application 431 in operation 432a, and may transfer the user-defined text shortcut data to the third application 433. In some embodiments, an update to the text shortcut data may be transmitted in operation 431c, from the phone device 431 to the wearable device 450. The update may be received in operation 432b via the "GalaxyWearableCompanionApp" 432 and then applied as an update to the "TextShortcuts" DB of the keyboard application 433 in operation 433a, thereby synchronizing the predictive text of the wearable device 450 with the phone device 431. In another embodiment, the third application 433 may send, back to the second application 432, the changed user-defined text shortcut data including information about the deleted or added user-defined text shortcut. The second application 432 may receive and determine the changed user-defined text shortcut data, and may then transfer the same to the first application 431. The first application 431 may receive the changed text shortcut data and may synchronize the same with a keyboard process of the electronic device 400. The electronic device 400 may thus synchronize even the user data with the keyboard process of the external device 405 through the above process.

Figure 11:
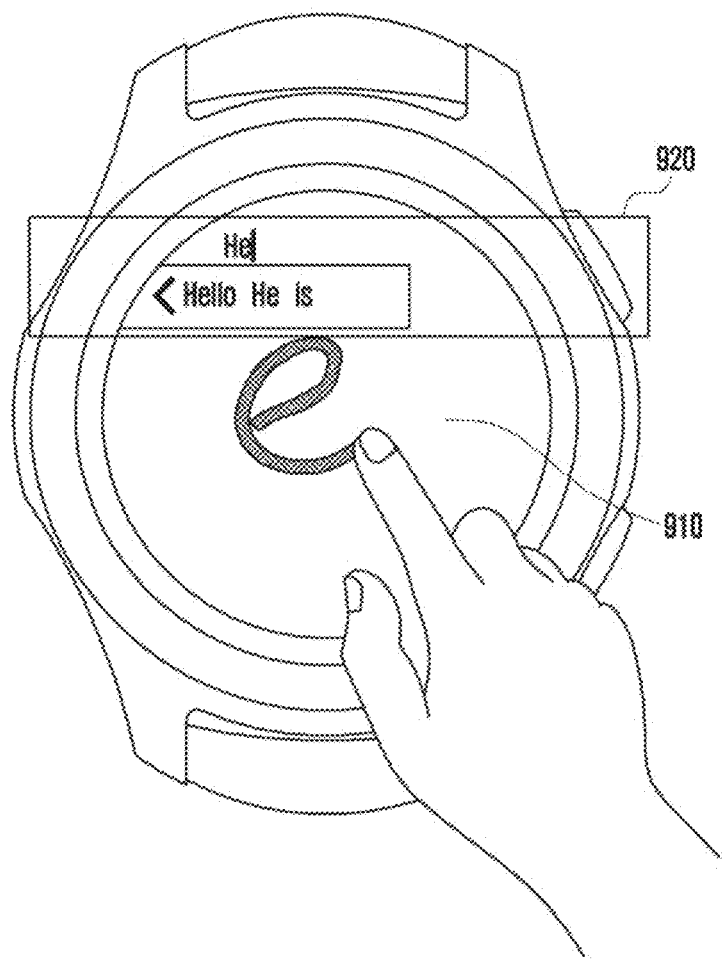
FIG. 11 illustrates a process of inputting a word through a new input means other than a keyboard on an electronic device according to certain embodiments.

FIG. 11 illustrates a process of inputting a word through a new input means other than a keyboard on an electronic device according to certain embodiments.

According to an embodiment, a processor (e.g., the processor 410 in FIG. 4) may perform control such that a input field 930 for displaying input letters, a predictive-text word recommendation region 920 for completing letters to be input and presenting the same to a user, and the letter keypad region 910 are displayed on a display (e.g., the display 420 in FIG. 4) in a typing mode, may control, when a writing input by a touch in the input field 930 is recognized, a trajectory according to the input to be displayed in the input field 930, and may control a letter corresponding to the writing input to be displayed, or may control a recommended letter corresponding to the displayed letter to be displayed in the word recommendation region 920. The letter keypad region 910 may be displayed in the form of a keyboard as in the electronic device 400 in FIG. 9B, and may provide an empty space, in which a writing input is possible, according to whether there is a touch input of the user as in the electronic device 400 in FIG. 11.

According to an embodiment, the processor 410 may deactivate a letter keypad input in the letter keypad region 910 when there is a touch-based writing input in the input field 930, and may perform control such that, on the display 420, the letter keypad region 910 is hidden and the input field 920 and the word recommendation region 930 are displayed.

According to an embodiment, when there is a writing input by a touch, the processor 410 may control a letter corresponding to the writing input to be displayed in the input field 930, and may control following letters capable of being input to be displayed in the word recommendation region 920.

FIGS. 12A to 12E illustrate a connection between external devices according to certain embodiments and a process of user word synchronization.

According to an embodiment, an electronic device may include at least one among a smartphone, an Internet of things (IoT) device, a smart car, an AR device, a VR device, an MR device, a desktop, a notebook, and a tablet PC.

Figure 12A:
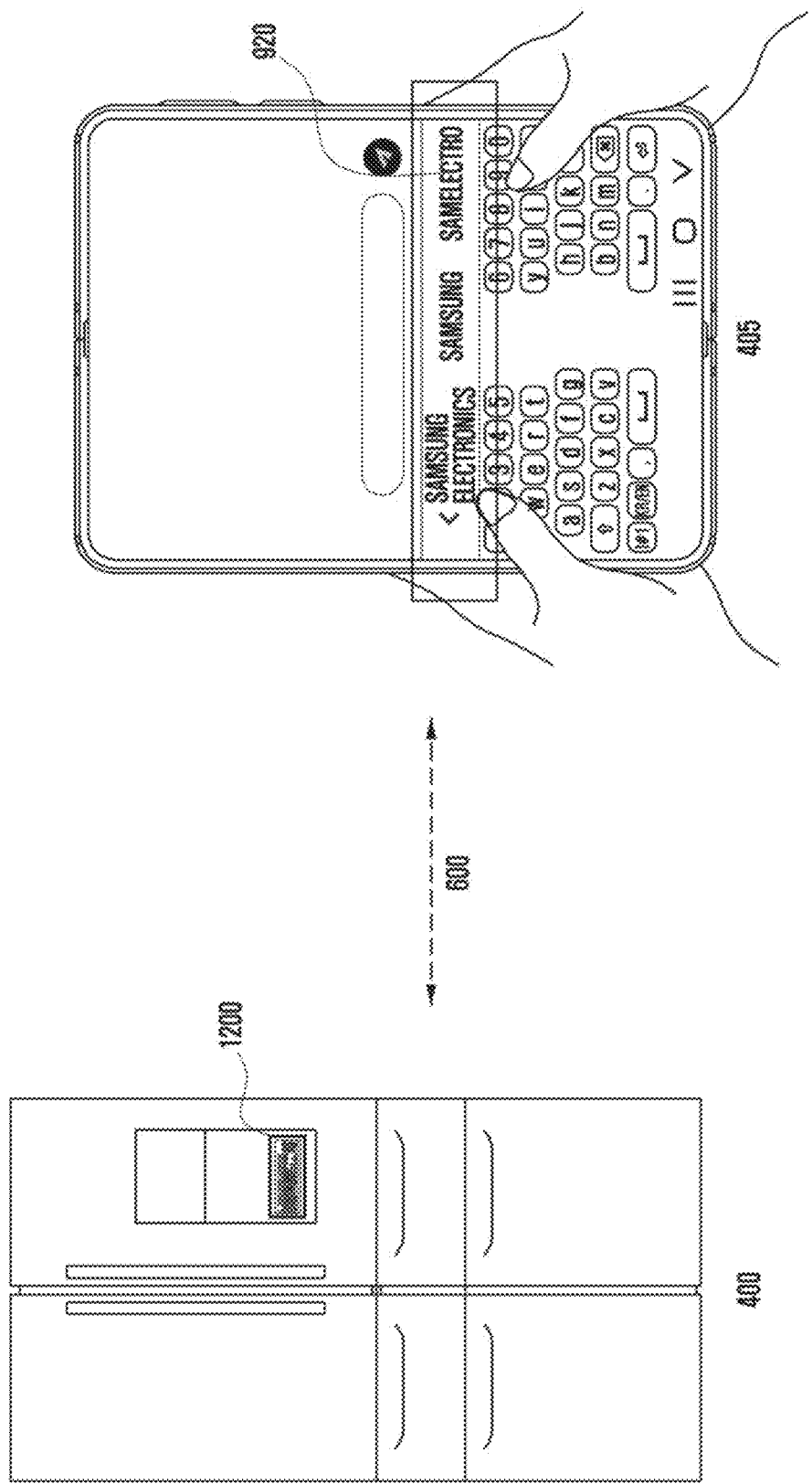
FIGS. 12A, 12B, 12C, 12D and 12E illustrate a connection between external devices according to certain embodiments and a process of user word synchronization.

According to FIG. 12A, an electronic device 400 may be connected to an external device 405 so as to receive and synchronize auto-complete text input information. For example, the electronic device 400 may include a refrigerator. The type of the electronic device 400 is not limited to a refrigerator, and any internet of things (IoT) device connectable to the external device 405 in a wired or wireless manner may be included. The electronic device 400 may include a display and a keyboard region 1200 for word inputting. In this case, the electronic device 400 may provide recommended words to a user through the process of synchronization of auto-complete text input information, described in FIGS. 6 to 10.

Figure 12B:
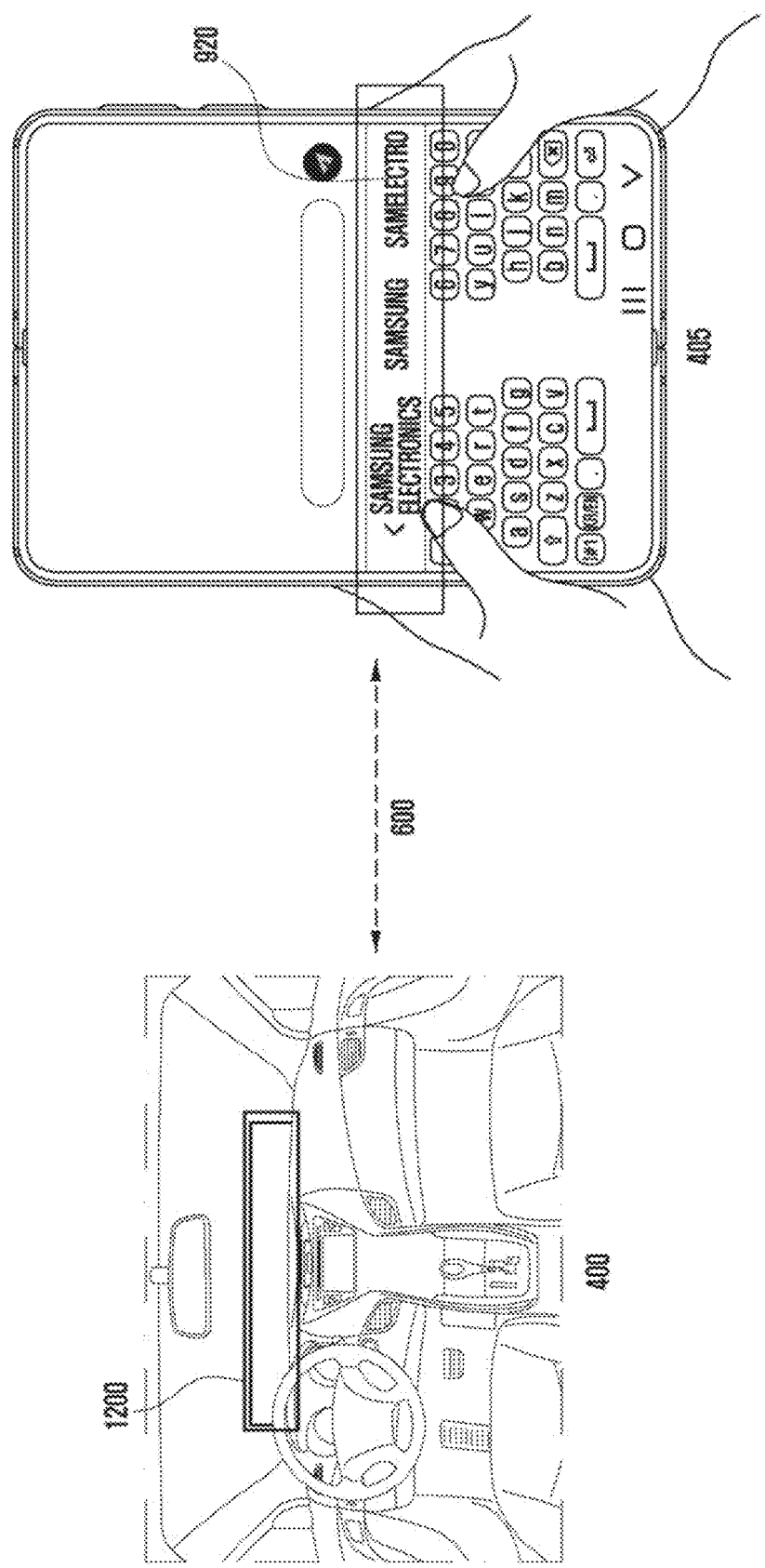

According to FIG. 12B, an electronic device 400 may be connected to an external device 405 so as to receive and synchronize auto-complete text input information. For example, the electronic device 400 may include a smart car. The electronic device 400 may include a display and a keyboard region 1200 for word inputting. The keyboard region 1200 of the smart car may be used, for example, in inputting a destination on a navigation or inputting a message in conjunction with a smartphone. In this case, the electronic device 400 may provide recommended words to a user through the process of synchronization of auto-complete text input information, described in FIGS. 6 to 10.

Figure 12C:
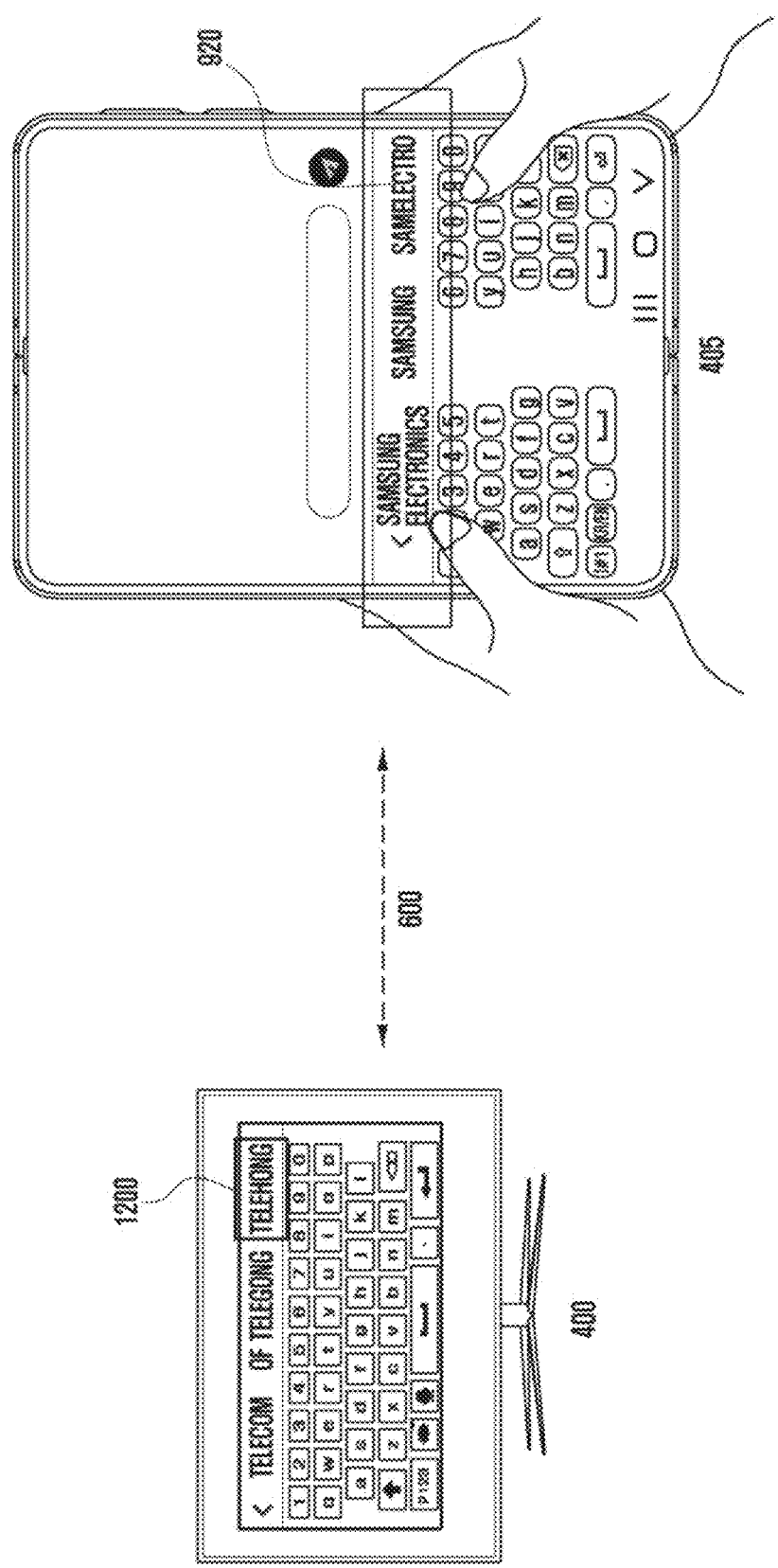

According to FIG. 12C, the electronic device 400 may be connected to an external device 405 so as to receive and synchronize auto-complete text input information. For example, the electronic device 400 may include smart TV. The electronic device 400 may include a display and a keyboard region 1200 for word inputting. The keyboard region 1200 on the smart TV may be used, for example, for channel searching or contents (movie, drama, etc.) searching. In this case, the electronic device 400 may provide recommended words to a user through the process of synchronization of auto-complete text input information, described in FIGS. 6 to 10.

Figure 12D:
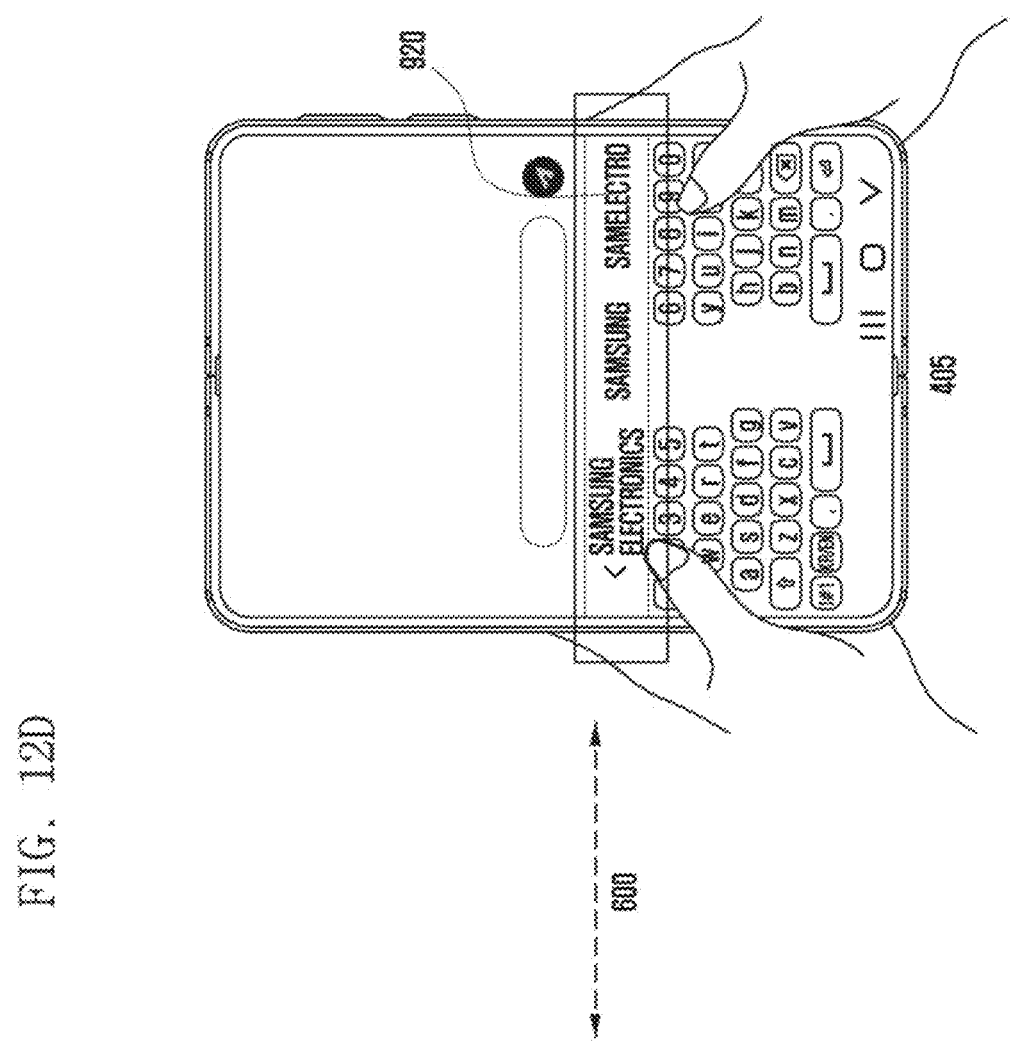
Figure 12D:
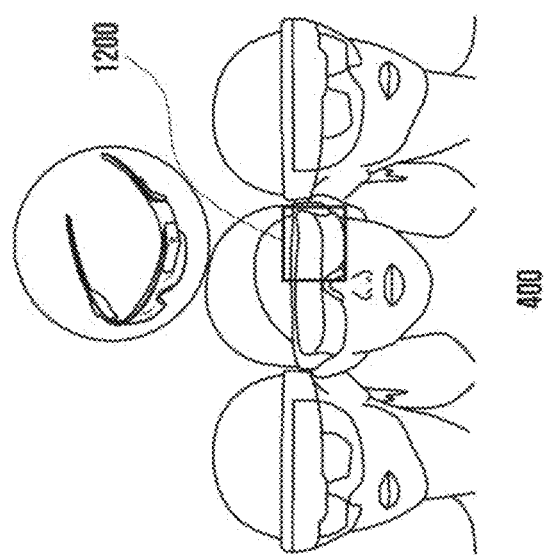

According to FIG. 12D, an electronic device 400 may be connected to an external device 405 so as to receive and synchronize auto-complete text input information. For example, the electronic device 400 may include an augmented reality (AR) device, a virtual reality (VR) device, and a mixed reality (MR) device. The electronic device 400 may display, in a virtual space, a display and a keyboard region 1200 for word inputting. The keyboard region 1200 of the augmented reality (AR), the virtual reality (VR) device, and the mixed reality (MR) device may be displayed on glass. In this case, the electronic device 400 may provide recommended words to a user through the process of synchronization of auto-complete text input information, described in FIGS. 6 to 10.

Figure 12E:
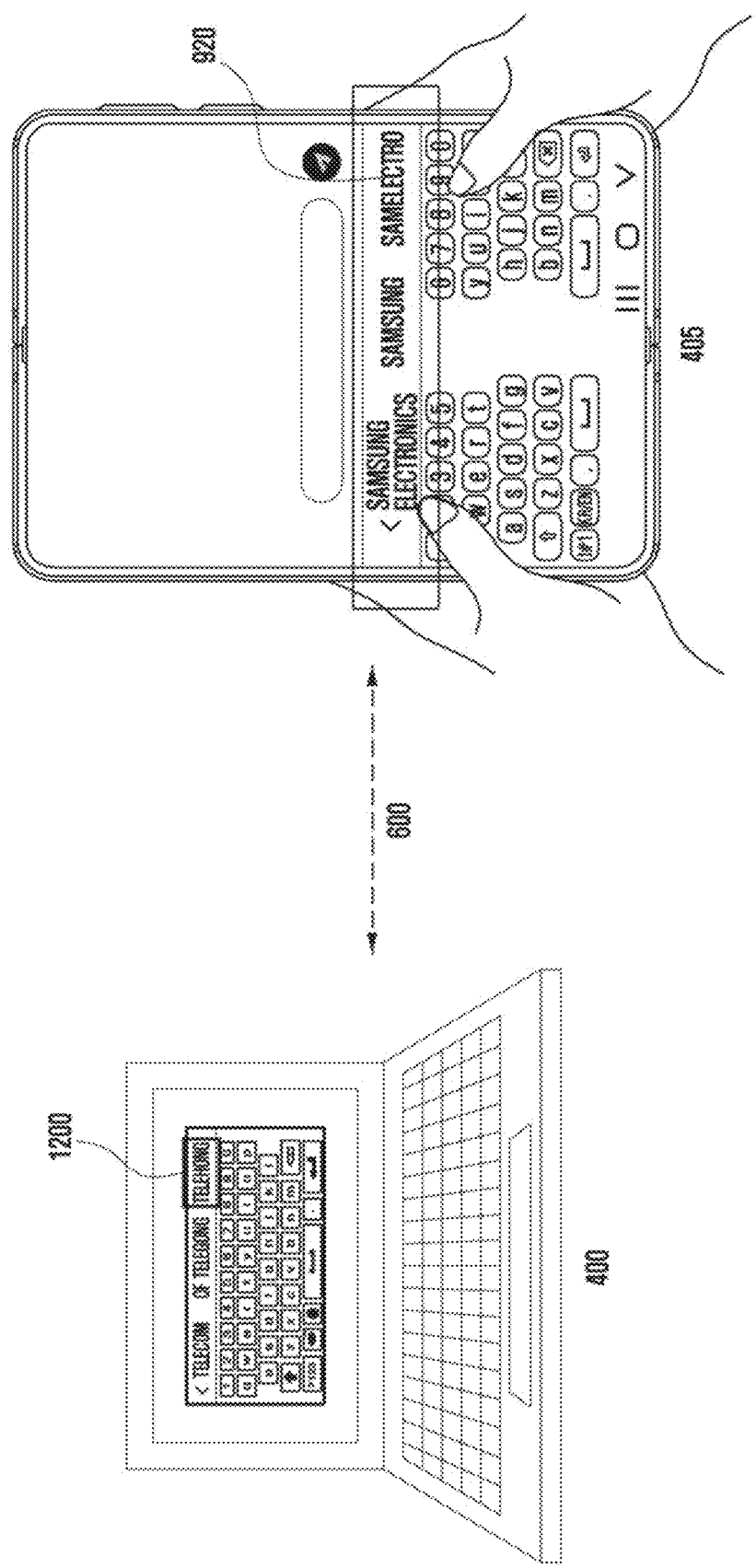

According to FIG. 12E, an electronic device 400 may be connected to an external device 405 so as to receive and synchronize auto-complete text input information. For example, the electronic device 400 may include a tablet PC or a notebook. The electronic device 400 may include a display and a keyboard region 1200 for word inputting. In this case, the electronic device 400 may provide recommended words to a user through the process of synchronization of auto-complete text input information, described in FIGS. 6 to 10.

Figure 13:
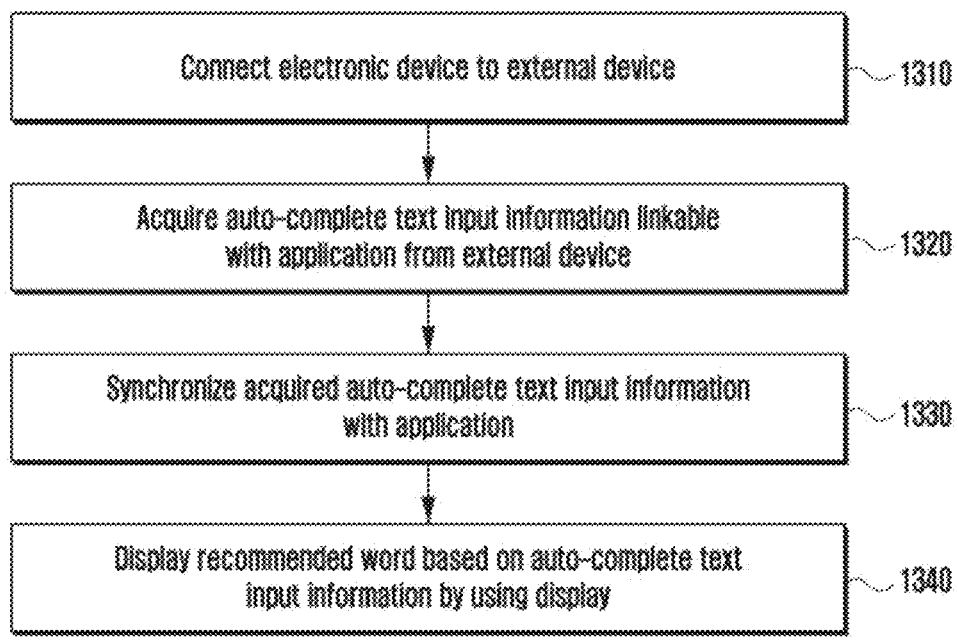
FIG. 13 illustrates, in order, a process of use word synchronization by an electronic device according to certain embodiments.

FIG. 13 illustrates, in order, a process of use word synchronization by an electronic device according to certain embodiments.

In operation 1310, an electronic device (e.g., the electronic device 400 in FIG. 4) may establish a communicative connection to an external device (e.g., the external device 500 in FIG. 5). As described with reference to FIG. 6, the electronic device 400 may execute an application related to wireless connection establishment. The electronic device 400 may display, in response to a user's request, a user interface (or an execution screen) of the application through the display 420. According to an embodiment, the electronic device 400 may search, based on the application execution, for devices include the external device 405 to which communication may be established, and may provide, to the user, a list indicating any discovered nearby communicable devices, including the external device 405.

According to an embodiment, after the user selects the external device 405 from the list, the electronic device 400 may attempt to establish a communicative connection to the external device 405. For example, the user may select (e.g., touch), in the list, an icon corresponding to a specific external device 405 to execute a connection service 600 with the specific external device 405 (e.g., a first connection method. According to an embodiment, without designating a specific external device 405, the user may perform the connection service 600 with respect to all found external devices 405 (e.g., a second connection method). In an embodiment, the first connection method may be, for example, a method by which the user designates one external device among discovered external devices and connects the electronic device to the designated external device. In an embodiment, the second connection method may be, for example, a method by which the user initiates, based on all found external devices, a connection service without designating one external device among the discovered external devices and makes a connection by approaching the external device 405, which the user desires to connect, while the connection service is performed (e.g., a first user interface is provided).

In operation 1320, the electronic device 400 may acquire auto-complete text input information (e.g., indicative of predictive text information) that is interoperable with an application from the external device 405. As described with reference to FIG. 7A to 7C, the second application 432 on the external device 405 may perform a fetch operation. The fetch operation may include at least one among a first operation (e.g., a text shortcut operation), a second operation (e.g., a user data model collection operation), or a third operation (e.g., a query request transfer operation). Here, the first operation may be an operation of preparing collection of text shortcut data defined by the user. The second operation may be an operation of preparing collection user data. The third operation may be an operation of making a request to the third application 433 for the text shortcut data defined by the user and/or the user data. A query may be an act of making a request to a server or a database for information.

According to certain embodiments, the third application 433 may transmit a first content to the second application 432 in response to the fetch operation of the second application 432. The first content may include user data and/or user-defined text shortcut data. The user data may be data recommended as a completed word by a program collecting and self-learning data on a word which is frequently used but not separately defined in setting by the user. Furthermore, the user-defined text shortcut data may be a text shortcut configured by a user and a completed word corresponding to the text shortcut.

The third application 433 of the external device 405 may determine whether a request for a fetch operation is made from the second application 432. When there is the request for a fetch operation, the third application 433 may first determine whether there is a request for processing a user-defined text shortcut. When the request for processing a user-defined text shortcut, the third application 433 may use a database (DB) of user-defined text shortcuts to transmit requested user-defined text shortcut data to the second application 432.

Alternatively, when there is no request for processing user-defined text shortcut information but there is a request for user data, the third application 433 may extract user data from a prediction engine, and may transmit the extracted user data to the second application 432.

The third application 433 may transmit the first content in response to the fetch operation, for which a request is made to the second application 432. The second application 432 may receive a transmission signal from the third application 433, and may determine whether there is the first content. When there is the first content, the second application 432 may use a file uniform resource identifier (fileuri) to receive the first content from the third application 433. The fileuri may be a unique identifier of a first content file. The second application 432 may transfer the received first content to the first application 431.

In operation 1330, the electronic device 400 may synchronize the acquired auto-complete text input information (e.g., the received predictive text information) with the application (e.g., with a keypad application and/or message composition application, etc.).

According to certain embodiments, the third application 433 may transmit the first content to the second application 432 in response to the fetch operation of the second application 432. The first content may include user data and/or user-defined text shortcut data. According to certain embodiments, the first application 431 of the electronic device 400 may receive the first content from the second application 432, and may synchronize the same. The processor 410 may synchronize the first content and may display the synchronized first content on the display 420.

According to certain embodiments, the first application 431 of the electronic device 400 may receive the first content from the second application 432, and may synchronize the same.

In operation 1340, the electronic device 400 may display recommended words based on the auto-complete text input information. That is, when the keyboard, keypad and/or message composition application are executed, when the user inputs text, the received auto-complete text input information (e.g., predictive text information) may be utilized to identify and generate predictive text corresponding to the user's inputs. The user may generate selections of predictive text for input into a message under composition.

According to an embodiment, a processor (e.g., the processor 410 in FIG. 4) may perform control such that a input field (e.g., the input field 930 in FIG. 9) for displaying input letters, a word recommendation region (e.g., the word recommendation region 920 in FIG. 9) for completing letters to be input and presenting the same to a user, and a letter keypad region (e.g., the letter keypad region 910 in FIG. 9) are displayed on a display (e.g., the display 420 in FIG. 4) in a typing mode.

The external device 405 may store words or text shortcuts which a user frequently uses in a keyboard (e.g., the keyboard 910 in FIG. 9) of a terminal, or may extract data on words input by the user through learning to display recommended words. For example, when the user inputs "Sam" on the external device 405, the external device 405 may present, in the recommendation region 920b, words or text shortcuts, such as "Samsung Electronics, Samsung, and SamElectro" which have been used by the user previously. Subsequently, the external device 405 may display a recommended word selected by the user in the word display region 930. The electronic device 400 may receive user content data from the second application 432, and may synchronize the same. The electronic device 400, like the external device 405, may present, in the recommendation region 920a, words or text shortcuts, such as "Samsung Electronics, Samsung, and SamElectro" which have been used by the user previously.

Furthermore, the display of each of the electronic device 400 and the external device 405 may include the input field 930 for displaying input letters, the word recommendation region 920 for completing letters to be input and presenting the same to a user, and the letter keypad region 910. For example, when the user may input the letters "hbd" in the input field 930 by using the letter keypad region 910, the electronic device 400 may use learned user words or text shortcuts to display a completed word "honeyboard" as a recommended word in the word recommendation region 920.

According to certain embodiments, an auto-complete text input method by an electronic device may include operatively connecting the electronic device to an external device, acquiring auto-complete text input information linkable with an application from the external device, synchronizing the acquired auto-complete text input information with the application, and performing control such that a display is used to a recommended word based on the auto-complete text input information.

According to an embodiment, when the auto-complete text input information is changed on the external device, a processor may recognize a changed content and may transfer the changed content to a keyboard process of the electronic device in real time.

According to an embodiment, the changed content of the auto-complete text input information may include at least one among addition, correction, and deletion of user data and/or may include at least one among addition, correction, and deletion of a user-defined text shortcut.

According to an embodiment, the processor may perform control such that a input field configured to display an input letter, a word recommendation region configured to complete a letter to be input and presenting the letter to a user, and a letter keypad region are displayed on a display in a typing mode (e.g., a letter input mode), may control, when a writing input by a touch in the input field is recognized, a trajectory according to the input to be displayed in the input field, and may control a letter corresponding to the writing input to be displayed or may control a recommended letter corresponding to the writing input to be displayed in the word recommendation region.

According to an embodiment, the processor may deactivate a letter keypad input in the letter keypad region when there is a touch-based writing input in the input field, and may control, on the display, the letter keypad region to be hidden and the input field and the word recommendation region to be displayed.

According to an embodiment, when there is a writing input by the touch, the processor may control a letter corresponding to the writing input to be displayed in the input field, and may control following letters capable of being input to be displayed in the word recommendation region.

According to an embodiment, the processor may receive the auto-complete text input information of the external device and/or a language database of the keyboard process of the external device and may synchronize the same so as to be usable in the electronic device.

According to an embodiment, the recommended word based on the auto-complete text input information may include a word and a text shortcut which the user uses in a frequency of a first level or more in the external device.

According to an embodiment, the processor may control the word and the text shortcut, which the user uses in a frequency of the first level or more in the external device, to be displayed on the display and recommended to the user.

According to an embodiment, the electronic device may include at least one among an Internet of Things (IoT) device, a smart car, an AR device, a VR device, an MR device, a desktop, a notebook, and a tablet PC.

An auto-complete text input method by an electronic device according to certain embodiments may include performing control to operatively connect a keyboard process of an external device to a data reception manager of the electronic device, acquiring auto-complete text input information from the external device, synchronizing the acquired auto-complete text input information with a keyboard process of the electronic device, and performing control to display a recommended word based on the auto-complete text input information by using a display, wherein the auto-complete text input information includes user data, which indicates data recommended as a completed word to a user by the electronic device collecting and self-learning data on a word frequently used by the user, and/or user-defined text shortcut data, which indicates a text shortcut configured by the user and a completed word corresponding to the text shortcut.

According to an embodiment, the performing of control to operatively connect the keyboard process of the external device to the data reception manager of the electronic device may include determining a pairing process, sending a notification to the electronic device when the pairing process is completed, commanding the external device to receive data related a keyboard or a user language, and storing, in an internal memory, a fact that the pairing process has been completed.

According to an embodiment, the acquiring of the auto-complete text input information from the external device may include recognizing a changed content when the auto-complete text input information is changed on the external device, and transferring the changed content to the keyboard process of the electronic device in real time.

According to an embodiment, the changed content of the auto-complete text input information may include at least one among addition, correction, and deletion of user data and/or may include at least one among addition, correction, and deletion of a user-defined text shortcut.

According to an embodiment, the performing of control to display the recommended word based on the auto-complete text input information by using the display may include performing control such that a input field configured to display an input letter, a word recommendation region configured to complete a letter to be input and presenting the letter to a user, and a letter keypad region are displayed on the display in a typing mode, controlling, when a writing input by a touch in the input field is recognized, a trajectory according to the input to be displayed in the input field, and controlling a letter corresponding to the writing input to be displayed, or controlling a recommended letter corresponding to the writing input to be displayed in the word recommendation region.

According to an embodiment, the method may further include deactivating a letter keypad input in the letter keypad region when there is a touch-based writing input in the input field, and controlling, on the display, the letter keypad region to be hidden and the input field and the word recommendation region to be displayed.

According to an embodiment, the performing of control to display the recommended word based on the auto-complete text input information by using the display may include performing control such that a input field configured to display an input letter, a word recommendation region configured to complete a letter to be input and presenting the letter to a user, and a letter keypad region are displayed on the display in a typing mode, controlling, when there is a writing input by a touch, a letter corresponding to the writing input to be displayed in the input field, and controlling following letters capable of being input to be displayed in the word recommendation region.

According to an embodiment, the synchronizing of the acquired auto-complete text input information with the keyboard process of the electronic device may include receiving the auto-complete text input information of the external device and/or a language database of the keyboard process of the external device and synchronizing the same so as to be usable in the electronic device.

According to an embodiment, the recommended word based on the auto-complete text input information may include a word and a text shortcut which the user uses in a frequency of a first level or more in the external device, and the performing of control to display the recommended word based on the auto-complete text input information by using the display may include controlling the word and the text shortcut, which the user uses in a frequency of the first level or more in the external device, to be displayed on the display and recommended to the user.

What is claimed is:

1. An electronic device, comprising:
communication circuitry;
a display;
memory storing instructions; and
a processor, operably coupled to the communication circuitry, the display and the memory,
wherein the instructions are executable by the processor to cause the electronic device to:
establish a communicative connection to an external device via the communication circuitry,
receive, via the communicative connection, auto-complete text input information from the external device,
wherein the auto-complete text input information includes user-defined text shortcuts pre-configured by a user and stored in the external device, the user-defined text shortcuts being configured to associate a predefined input with a complete word, and the user-defined text shortcuts configured by the user which associates incomplete input with completed words for usage as predictive text, store the received auto-complete text input information in the memory, for usage with a keyboard process of the electronic device, and
control the display to display a recommended word based on the stored auto-complete text input information, and at least one keyboard input.

2. The electronic device of claim 1, wherein the processor is further configured to:
when the auto-complete text input information is updated on the external device, receive a transmission including a real-time update of the auto-complete text input information for application to the keyboard process.

3. The electronic device of claim 2, wherein the update includes
at least one of an addition, a correction, and a deletion to the user data and/or the user-defined text shortcuts.

4. The electronic device of claim 1, wherein the processor is further configured to:
when a typing mode is executed, control the display to display a keypad, an input field displaying at least letters input by the user via the keypad, and a word recommendation region for displaying a predictive text selected based on the input letters, and
responsive to detecting a drag input to the input field, control the display to display a trace of the drag input.

5. The electronic device of claim 4, wherein the processor is further configured to:
deactivate the keypad while the drag input is detected to the input field, including hiding the keypad from display while maintaining display of the input field and the word recommendation region.

6. The electronic device of claim 4, wherein the processor is further configured to:
responsive to detecting the drag input, control the display to display in the input field a letter corresponding to the trace, and
control the display to display at least one predictive word from a plurality of complete words, and another plurality of complete words insertable into the input field, based on the letter corresponding to the trace.

7. The electronic device of claim 1, wherein the processor is further configured to:
synchronize a local auto-complete text input information with the stored auto-complete text input information received from the external device for usage with the keyboard process; and
receive a transmission of a language database from the external device, and synchronize a local language database with the received language database from the external device for usage with the keyboard process.

8. The electronic device of claim 1, wherein the auto-complete text input information includes a plurality of completed words and a plurality of text shortcuts categorized into hierarchical levels based on frequency of usage by the user,
wherein the recommended word is selected from among a subset of the plurality of completed words categorized at a first level of frequency of usage, from among the hierarchical levels, and
wherein a recommended text shortcut is selected along with the recommended word, the recommended text shortcut selected from among a subset of the plurality of text shortcuts categorized at the first level.

9. The electronic device of claim 8, wherein the processor is further configured to:
display the recommended text shortcut with the recommended word.

10. The electronic device of claim 1, wherein the electronic device includes at least one of an Internet of Things (IoT) device, a smart car, an augmented reality device, a virtual reality device, an mixed reality device, a desktop computer device, a notebook computer device, and a tablet computer device.

11. A method of an electronic device, the method comprising:
  establishing, by control of a processor, a communicative connection to an external device via communication circuitry;
  receiving via the communicative connection, auto-complete text input information from the external device, wherein the auto-complete text input information includes user-defined text shortcuts pre-configured by a user and stored in the external device, the user-defined text shortcuts being configured to associate a pre-defined input with a complete word, the user defined text shortcuts configured by the user which associates incomplete input with completed words for usage as predictive text,
  storing, in a memory, the received auto-complete text input information, for usage with a keyboard process of the electronic device; and
  displaying, via a display, a recommended word based on the stored auto-complete text input information, and at least one keyboard input.

12. The method of claim 11, wherein establishing the communicative connection further includes:
  executing a pairing process with the external device;
  transmitting a notification to the external device when the pairing process is complete;
  transmitting a request to the external device for data related to a keyboard process or an input language; and
  storing, in the memory, an indication that the pairing process is complete.

13. The method of claim 11, wherein receiving the auto-complete text input information from the external device further includes:
  when the auto-complete text input information is updated on the external device, receiving a transmission including a real-time update of the auto-complete text input information for application to the keyboard process.

14. The method of claim 13, wherein the update includes at least one of an addition, a correction, and a deletion to the user data and/or the user-defined text shortcuts.

15. The method of claim 11, further comprising:
  when a typing mode is executed, displaying a keypad, an input field displaying at least letters input by the user via the keypad, and a word recommendation region for displaying a predictive text selected based on the input letters, and
  responsive to detecting a drag input to the input field, displaying a trace of the drag input.

16. The method of claim 15, further comprising:
  deactivating the keypad while the drag input is detected to the input field, including hiding the keypad from display while maintaining display of the input field and the word recommendation region.

17. The method of claim 15, further comprising:
  responsive to detecting the drag input, displaying in the input field a letter corresponding to the trace, and
  displaying at least one predictive word from a plurality of complete words, and another plurality of complete words insertable into the input field, based on the letter corresponding to the trace.

18. The method of claim 11, further comprising:
  synchronizing a local auto-complete text input information with the stored auto-complete text input information received from the external device for usage with the keyboard process; and
  receiving a transmission of a language database from the external device, and synchronize a local language database with the received language database from the external device for usage with the keyboard process.

19. The method of claim 11, wherein the auto-complete text input includes a plurality of completed words and a plurality of text shortcuts categorized into hierarchical levels based on frequency of usage by the user,
  wherein the recommended word is selected from among a subset of the plurality of completed words categorized at a first level of frequency of usage, from among the hierarchical levels, and
  wherein a recommended text shortcut is selected along with the recommended word, the recommended text shortcut selected from among a subset of the plurality of text shortcuts categorized at the first level.

20. The method of claim 19, wherein the electronic device includes at least one of an Internet of Things (IoT) device, a smart car, an augmented reality device, a virtual reality device, a mixed reality device, a desktop computer device, a notebook computer device, and a tablet computer device.

* * * * *